US008932769B2

(12) United States Patent
Ohashi

(10) Patent No.: US 8,932,769 B2
(45) Date of Patent: Jan. 13, 2015

(54) FUEL CELL ASSEMBLY AND VEHICLE

(75) Inventor: Yasuhiko Ohashi, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 390 days.

(21) Appl. No.: 13/258,523
(22) PCT Filed: May 28, 2009
(86) PCT No.: PCT/JP2009/059785
§ 371 (c)(1),
(2), (4) Date: Sep. 22, 2011
(87) PCT Pub. No.: WO2010/137151
PCT Pub. Date: Dec. 2, 2010

(65) Prior Publication Data
US 2012/0028135 A1 Feb. 2, 2012

(51) Int. Cl.
*H01M 8/00* (2006.01)
*H01M 8/02* (2006.01)
(Continued)

(52) U.S. Cl.
CPC ............... *B60K 1/04* (2013.01); *Y02T 10/7216* (2013.01); *B60L 11/1887* (2013.01); *B60L 2210/10* (2013.01); *Y02T 10/705* (2013.01); *B62D 25/20* (2013.01); *B60L 11/1896* (2013.01); *Y02T 90/34* (2013.01); *B60K 2001/0438* (2013.01); *B60L 11/1892* (2013.01); *B60L 2210/40* (2013.01); *B60L 11/1877* (2013.01); *Y02T 90/32* (2013.01); *B60L 1/003* (2013.01); *B60L 11/1803* (2013.01); *B60L 2240/421* (2013.01); *H01M 2250/20* (2013.01); *B60L 3/0053* (2013.01); *H01M 8/247* (2013.01); *Y02E 60/50* (2013.01); *B60L 7/16* (2013.01); *Y02T 10/642* (2013.01); *B60L 11/1898* (2013.01); *B60L 2240/36* (2013.01); *Y02T 10/7241* (2013.01); *H01M 8/2475* (2013.01)

USPC ........................................ 429/400; 180/65.31

(58) Field of Classification Search
None
See application file for complete search history.

(56) References Cited

U.S. PATENT DOCUMENTS 5,515,939 A    5/1996 Korall et al.
6,819,066 B2  11/2004 Ishikawa et al.
(Continued)

FOREIGN PATENT DOCUMENTS

CN    1482971 A      3/2004
JP    07-108956 A    4/1995
(Continued)

OTHER PUBLICATIONS

Abstract and machine translation of JP 7-117489, May 1995.*
(Continued)

*Primary Examiner* — Jonathan Crepeau
(74) *Attorney, Agent, or Firm* — Kenyon & Kenyon LLP

(57) ABSTRACT

Provided is a mounting structure of a fuel cell system capable of withstanding a collision from the side face of a fuel cell vehicle. The fuel cell system comprises a fuel cell unit for housing a fuel cell, and a protective structure having a mounting surface for mounting the fuel cell unit. The protective structure includes sloping frames provided obliquely relative to the mounting surface at a position opposing at least one side face of the fuel cell unit. Since the protective structure has the sloping frames as the structural objects to be subjected to the impact of the collision from the side face, the protection of the entire height of the fuel cell unit is realized by the lightest structural objects.

7 Claims, 14 Drawing Sheets

(51) Int. Cl.
*B60K 1/04* (2006.01)
*B60L 11/18* (2006.01)
*B62D 21/00* (2006.01)
*B62D 25/20* (2006.01)
*B60L 1/00* (2006.01)
*B60L 3/00* (2006.01)
*H01M 8/24* (2006.01)
*B60L 7/16* (2006.01)

(56) References Cited

U.S. PATENT DOCUMENTS

| | | | |
|---|---|---|---|
| 8,037,960 | B2 | 10/2011 | Kiya |
| 8,330,429 | B2 | 12/2012 | Arakawa |
| 2003/0215687 | A1 | 11/2003 | Bruck et al. |
| 2004/0137321 | A1* | 7/2004 | Savaria et al. ............ 429/176 |
| 2004/0161654 | A1* | 8/2004 | DeVries ................... 429/34 |
| 2006/0102413 | A1* | 5/2006 | Ootani et al. ............ 180/274 |
| 2006/0251933 | A1 | 11/2006 | Hoffjann et al. |
| 2008/0196957 | A1 | 8/2008 | Koike et al. |

FOREIGN PATENT DOCUMENTS

| | | |
|---|---|---|
| JP | 7-117489 A | 5/1995 |
| JP | 07-117489 A | 9/1995 |
| JP | 10-291419 A | 11/1998 |
| JP | 2002-367648 A | 12/2002 |
| JP | 2003-146087 A | 5/2003 |
| JP | 2003-189415 A | 7/2003 |
| JP | 2004-161092 A | 6/2004 |
| JP | 2004-345447 A | 12/2004 |
| JP | 2005-205945 A | 8/2005 |
| JP | 2005-231549 A | 9/2005 |
| JP | 2005-306104 A | 11/2005 |
| JP | 2006-168604 A | 6/2006 |
| JP | 2006-176105 A | 7/2006 |
| JP | 2006-196386 A | 7/2006 |
| JP | 2006-256442 A | 9/2006 |
| JP | 2006-335212 A | 12/2006 |
| JP | 2007-015591 A | 1/2007 |
| JP | 2007-015600 A | 1/2007 |
| JP | 2007-015612 A | 1/2007 |
| JP | 2007-015613 A | 1/2007 |
| JP | 2007-015614 A | 1/2007 |
| JP | 2007-015616 A | 1/2007 |
| JP | 2007-039004 A | 2/2007 |
| JP | 2007-106361 A | 4/2007 |
| JP | 2007-209161 A | 8/2007 |
| JP | 2007-230329 A | 9/2007 |
| JP | 2007-237779 A | 9/2007 |
| JP | 2007-245954 A | 9/2007 |
| JP | 2007-258164 A | 10/2007 |
| JP | 2007-318938 A | 12/2007 |
| JP | 2008-100584 A | 5/2008 |
| JP | 2008-100585 A | 5/2008 |
| JP | 2009-023528 A | 2/2009 |
| JP | 2009-083598 A | 4/2009 |
| JP | 2009-148051 A | 7/2009 |
| WO | 03/104010 A1 | 12/2003 |
| WO | 2009/001483 A1 | 12/2009 |

OTHER PUBLICATIONS

U.S. Office Action of Dec. 20, 2012 U.S. Appl. No. 13/258,539.
International Search Report issued Jul. 21, 2009 of PCT/JP2009/059779.
International Search Report issued Jul. 21, 2009 of PCT/JP2009/059774.
International Search Report issued Jul. 21, 2009 of PCT/JP2009/059777.
International Search Report issued Jul. 21, 2009 of PCT/JP2009/059785.
Notice of Allowance issued Sep. 18, 2014, in U.S. Appl. No. 13/259,902.

\* cited by examiner

FUEL CELL ASSEMBLY AND VEHICLE

This is a 371 national phase application of PCT/JP2009/059785 filed May 28, 2009, the contents of which are incorporated herein by reference.

TECHNICAL FIELD

The present invention relates to a vehicle mounted with a fuel cell system, and particularly relates to a mounting structure of a fuel cell and a fuel cell related device such as a DC/DC converter.

BACKGROUND ART

A vehicle (hereinafter also referred to as a "fuel cell vehicle") configured to travel by supplying power from a fuel cell system and driving a vehicle driving motor is being developed. With a fuel cell vehicle, safety during collision is ensured by disposing the components of the fuel cell system underneath the floor in the center of the vehicle.

For example, JP 2005-205945 A discloses a vehicle mounting structure in which a fuel cell unit and a accessory unit are arranged so as to be adjacent to each other underneath the vehicle body floor which is enclosed by a floor frame provided in a vehicle front-back direction of a fuel cell vehicle, and by a cross member provided in a vehicle width direction. According to this structure, the tubing length and wiring length can be shortened, and the collision safety can be ensured (Patent Literature 1).

JP2007-245954 A discloses technology concerning a configuration of mounting a fuel cell and a drive motor within a motor room at the front of a vehicle, supporting the fuel cell on the upper side of a support frame, providing the drive motor on the lower side of the side frame, and guiding the drive motor along a guide frame during collision of the foreside (Patent Literature 2).

JP2007-258164 A discloses technology concerning a configuration of providing a load bearing member as a beam-shaped member across the end plates of a fuel cell stack so as to absorb the impact load that is directly applied to the fuel cell (Patent Literature 3).

JP2008-100585 A discloses technology concerning a configuration of providing a reinforcing member which slidably penetrates a fuel cell stack in a vehicle width direction, and transmitting the impact force from the vehicle side face, which is transmitted via the seat, from the collision side to the non-collision side via the reinforcing member (Patent Literature 4).

A DC-DC converter which raises or lowers the output voltage of a fuel cell is disclosed, for example, in JP2007-209161 A and JP2007-318938 A. The publications do not particularly disclose an impact alleviation structure of the DC-DC converter (Patent Literature 5 and Patent Literature 6).

CITATION LIST

Patent Literature

[Patent Literature 1] Japanese Patent Publication No.2005-205945 A
[Patent Literature 2] Japanese Patent Publication No.2007-245954 A
[Patent Literature 3] Japanese Patent Publication No.2007-258164 A
[Patent Literature 4] Japanese Patent Publication No.2008-100585 A
[Patent Literature 5] Japanese Patent Publication No.2007-209161 A
[Patent Literature 6] Japanese Patent Publication No.2007-318938 A

SUMMARY OF INVENTION

Technical Problem

Nevertheless, with the mounting structures of the foregoing conventional technologies, it was not possible to sufficiently protect the fuel cell unit from a collision of an object from the side face of the fuel cell vehicle.

For example, with the technology of Patent Literature 1, the floor frame once absorbs the impact of the side collision and alleviates the impact to the fuel cell unit. However, depending on the strength of the impact of the side collision or the height of the object, the object may reach the mounting position of the fuel cell unit. The technology of Patent Literature 2 is able to deal with a collision from the foreside of the vehicle front face, but does not give consideration to protecting the fuel cell stack against impacts from the lateral side of the vehicle. The technologies of Patent Literature 3 and Patent Literature 4 relate to inventions of adding a member for reinforcing the mechanical strength of the fuel cell stack. However, a reinforcing member of a level that can be attached to a fuel cell is limited in the impact that it can withstand. Contrarily, if the rigidity of the reinforcing member is to be increased in order to improve the impact resistance, there is no choice but to increase the weight of the member, and deterioration in fuel economy associated with the increase of vehicle weight could not be avoided. Since the DC-DC converter described in Patent Literature 5 and Patent Literature 6 is a peripheral device provided in the vicinity of a fuel cell, if there is any defect in the mounting structure thereof, there is a possibility that it would run into the fuel cell due to the impact during the vehicle collision and cause fuel gas leakage.

Thus, an object of this invention is to provide a mounting structure of a fuel cell system capable of withstanding a collision from the side face of a fuel cell vehicle while inhibiting the increase in the vehicle weight.

Solution To Problem

The fuel cell assembly of the present invention for solving the foregoing problems comprises a fuel cell unit configured to house a fuel cell, and a protective structure having a mounting surface configured to mount the fuel cell unit, the protective structure including a sloping frame provided obliquely relative to the mounting surface at a position opposing at least one side face of the fuel cell unit.

If the impact of a collision is too strong when an object collides into a fuel cell vehicle from the side face thereof, the floor frame cannot absorb the impact of the collision, and the object will reach the fuel cell unit. Moreover, depending on the shape and height of the colliding object, protection by the floor frame will not function, and the object will reach the fuel cell unit. According to the foregoing configuration, since the fuel cell unit is mounted on a protective structure and a sloping frame is provided to the side face of the fuel cell unit, an object that approaches at the height of the fuel cell unit will initially come in contact at the position of either the protective structure or the sloping frame. Thus, it is possible to inhibit the impact from directly reaching the fuel cell unit. When the impact is applied to the protective structure or the sloping frame, the fuel cell unit absorbs the impact of the collision while moving, together with the protective structure, to the side that is opposite to the approaching side of the object. Thus, it is possible to effectively absorb the impact of the collision while protecting the fuel cell unit. In particular, with the protective structure, since a sloping frame is used as the structural object to be subjected to the impact of the collision from the side face, the protection of the entire height of the fuel cell unit is realized by the lightest structural object. Thus, the safety has been improved without deteriorating the fuel economy.

The present invention may be added with the following modes as intended.

(1) A configuration may be adopted where the fuel cell unit has an inclined flange that is provided on the at least one side face and is inclined relative to the surface mounted on the protective structure, and the protective structure and the fuel cell unit are mounted so that the side face to which the inclined flange of the fuel cell unit is provided opposes the sloping frame of the protective structure, and so that the sloping frame and the inclined flange intersect when viewed from the side.

According to the foregoing configuration, foremost, since the inclined flange is provided to the side face of the fuel cell unit, regardless of the height of the object that collides from the side face of the fuel cell unit, it is possible to protect the fuel cell provided within the fuel cell unit. Moreover, since the inclined flange of the fuel cell unit is provided so as to intersect with the sloping frame of the protective structure, an intersecting beam structure is formed, and resistance to the impact from the side face can be further improved.

(2) A configuration may be adopted where at least one face of the fuel cell unit is provided with a relief shape.

According to the foregoing configuration, since the mechanical strength of the face to which the relief shape is provided can be further increased, it is possible to provide a fuel cell assembly with even higher impact resistance. Note that there is no limitation to the face where the relief shape can be provided, and the relief shape can be provided to one or more among the top face, the bottom face, and a plurality of side faces of the fuel cell unit. Moreover, there is no limitation to the relief shape, and any arbitrary shape such as a structure with a plurality of protrusions, a depression structure, a shape with a saw-tooth cross section, or a waveform shape may be used.

(3) Preferably, a configuration is adopted where the fuel cell assembly is mounted on a vehicle, and the fuel cell assembly is mounted on the vehicle so that the sloping frame of the protective structure faces a side direction of the vehicle.

According to the foregoing configuration, since the sloping frame of the protective structure is positioned in the side direction of the vehicle, the sloping frame is subjected to the impact of the approaching object against a collision from the side face of the vehicle. Thus, the fuel cell unit can be protected from the impact.

(4) Preferably, the protective structure is fastened to a reinforcing frame configuring a part of a frame structure of the vehicle, and the reinforcing frame and the protective structure are fastened with a bracket which increases a fastening strength.

According to the foregoing configuration, the protective structure is fastened, with great strength, to the reinforcing frame as a part of the frame structure together with the bracket. Thus, even if the impact of the collision from the side face of the vehicle reaches the protective structure, the entire fuel cell assembly is rotated while moving around the portion that is fastened with the reinforcing frame in order to alleviate the impact of the collision, and the fuel cell is thereby protected from the impact.

(5) Preferably, the protective structure is provided with a related component of the fuel cell on a side that is opposite to a forward travel direction of the vehicle.

According to the foregoing configuration, since the related component of the fuel cell is mounted on the protective structure on a side that is opposite to the vehicle forward travel direction, the related component is not affected from a collision from the foreside of the vehicle, and moves together with the protective structure even when there is a collision from the side face of the vehicle. Thus, it is possible to effectively protect the related component of the fuel cell, such as a hydrogen supply system which is relatively susceptible to impact and with concern of hydrogen leakage, from the impact of the collision.

(6) Preferably, the mounting surface of the protective structure is provided with a panel.

According to the foregoing configuration, since the panel provided to the mounting surface of the protective structure increases the mechanical strength of the protective structure, it is possible to protect the fuel cell unit even if there is greater impact from the side face of the vehicle.

(7) A configuration may be adopted where the fuel cell unit further houses a power source related device.

According to the foregoing configuration, since the fuel cell unit houses a power source related device such as a DC-DC converter in addition to the fuel cell, it is also possible to additionally protect the power source related device from the impact of the collision from the side face of the vehicle.

(8) One mode of the present invention may be a vehicle comprising a fuel cell. This vehicle includes a fuel cell assembly having a fuel cell unit configured to house the fuel cell, and a protective structure having a mounting surface configured to mount the fuel cell unit, the protective structure includes a sloping frame provided obliquely relative to the mounting surface, and the protective structure and the fuel cell unit are mounted so that any side face of the fuel cell unit opposes the sloping frame of the protective structure, and mounted on the vehicle so that the sloping frame of the protective structure faces a lateral direction relative to a forward travel direction of the vehicle.

According to the foregoing configuration, with the fuel cell assembly mounted on a vehicle, the fuel cell unit is mounted on a protective structure, a sloping frame is provided to the side face of the fuel cell unit, and the sloping frame is arranged in the side direction of the vehicle. Thus, an object that approaches at the height of the fuel cell unit will initially come in contact at the position of either the protective structure or the sloping frame, and it is possible to inhibit the impact from directly reaching the fuel cell unit. When the impact is applied to the protective structure or the sloping frame, the fuel cell unit absorbs the impact of the collision while moving, together with the protective structure, to the side that is opposite to the approaching side of the object. Thus, it is possible to effectively absorb the impact of the collision while protecting the fuel cell unit. In particular, with the protective structure, since a sloping frame is used as the structural object to be subjected to the impact of the collision from the side face, the protection of the entire height of the fuel cell unit is realized by the lightest structural object. Thus, the safety has been improved without deteriorating the fuel economy.

Advantageous Effects of Invention

According to the present invention, since the fuel cell unit is mounted on the protective structure with a sloping frame, it is possible to protect the fuel cell from the impact of a collision from the side face of a vehicle without having to increase the vehicle weight.

BRIEF DESCRIPTION OF DRAWINGS

FIG. 10 is a diagram explaining the functions in the fuel cell assembly, wherein

FIG. 14 is a perspective view explaining the internal arrangement of the fuel cell unit in Embodiment 2, wherein

DESCRIPTION OF EMBODIMENTS

The preferred embodiments for working the present invention are now explained with reference to the appended drawings.

In the following description of the drawings, the same or similar reference number is given to the same or similar component. The drawings, however, are schematic. Accordingly, the specific dimensions and the like should be determined in light of the ensuing explanation. Moreover, it goes without saying that the relationship or ratio of the mutual dimensions may also differ among the respective drawings.
(Embodiment 1)

Embodiment 1 of the present invention relates to a fuel cell assembly in which a fuel cell unit which independently houses a fuel cell stack is mounted on a protective structure. In Embodiment 1, a fuel cell system including the fuel cell assembly is mounted on a vehicle (fuel cell vehicle). The configuration of the fuel cell system is foremost explained below, and details regarding the fuel cell assembly are explained subsequently.
(System Configuration)

Figure 1:
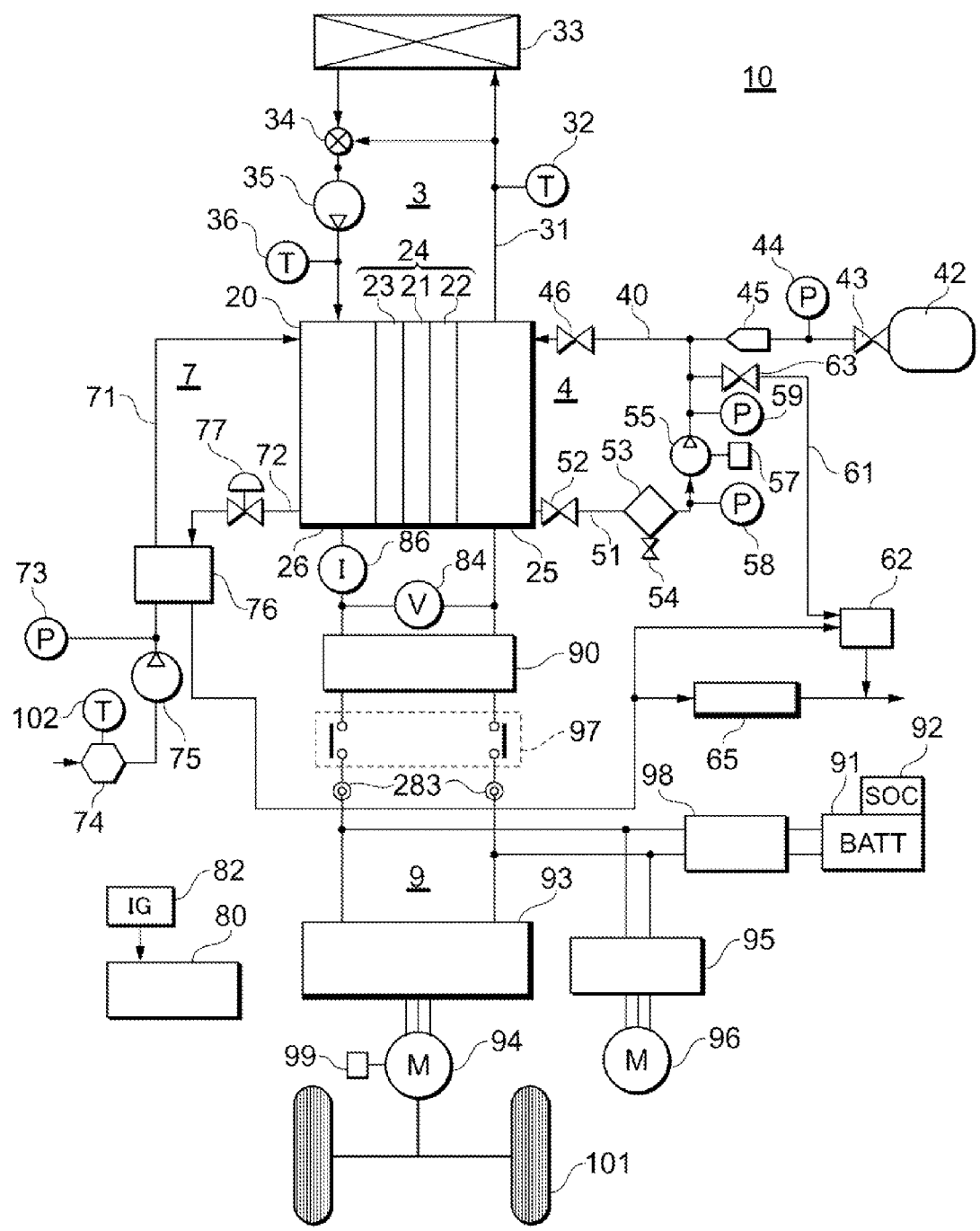
FIG. 1 is a system configuration diagram of the fuel cell system according to an embodiment of the present invention.

FIG. 1 is a configuration diagram of the fuel cell system to which the present invention is applied.

A fuel cell system 10 in FIG. 1 is configured by comprising a fuel gas supply system 4, an oxidation gas supply system 7, a coolant supply system 3, and a power system 9. The fuel gas supply system 4 is a system for supplying fuel gas (hydrogen gas) to a fuel cell 20. The oxidation gas supply system 7 is a system for supplying oxidation gas (air) to the fuel cell 20. The coolant supply system 3 is a system for cooling the fuel cell 20. The electric power system 9 is a system for charging and discharging the generated output from the fuel cell 20.

The fuel cell 20 comprises a membrane electrode assembly (MEA) 24, which is formed by screen printing an anode electrode 22 and a cathode electrode 23, on either face of a polyelectrolyte film 21 made from a proton conducting ion exchange membrane or the like formed from fluorinated resin or the like. Either face of the membrane electrode assembly 24 is sandwiched by a separator (not shown) with a flow passage of fuel gas, oxidation gas, and coolant. A groove-shaped anode gas channel 25 and a cathode gas channel 26 are respectively formed between the separator, and the anode electrode 22 and the cathode electrode 23. The anode electrode 22 is configured by providing a fuel electrode catalytic layer on a spongy support layer, and the cathode electrode 23 is configured by providing an air electrode catalytic layer on a spongy support layer. The catalytic layer of these electrodes is configured, for example, by being affixed with platinum particles. The fuel cell 20 generates the electrochemical reaction shown in Formulae (1) to (3) below.

$$H_2 \rightarrow 2H^+ + 2e^- \tag{1}$$

$$(\tfrac{1}{2})O_2 + 2H^+ + 2e^- \rightarrow H_2O \tag{2}$$

$$H_2 + (\tfrac{1}{2})O_2 \rightarrow H_2O \tag{3}$$

On the anode electrode 22 side, the reaction shown in Formula (1) is generated. On the cathode electrode 23 side, the reaction shown in Formula (2) is generated. As the overall fuel cell 20, the reaction shown in Formula (3) is generated. In order to generate this kind of electrochemical reaction, the fuel cell 20 is mounted on a vehicle in the form of a fuel cell unit by being housed in a housing described later.

Note that, for convenience of explanation, FIG. 1 schematically shows a unit cell structure configured from a membrane electrode assembly 24, an anode gas channel 25 and a cathode gas channel 26. In reality, the unit cell structure comprises a stack structure in which a plurality of unit cells (cell group) are connected in series via the foregoing separator.

The coolant supply system 3 of the fuel cell system 10 comprises a cooling path 31, temperature sensors 32 and 35, a radiator 33, a valve 34, and a coolant pump 35. The cooling path 31 is a flow passage for circulating the coolant. The temperature sensor 32 is a temperature detection means for detecting the temperature of the coolant that is drained from the fuel cell 20. The radiator 33 is a heat exchanger for radiating the heat of the coolant to the outside. The valve 34 is a valve means for regulating the amount of coolant to flow into the radiator 33. The coolant pump 35 is a drive means for pressurizing and circulating the coolant with a motor not shown. The temperature sensor 36 is a temperature detection means for detecting the temperature of the coolant supplied to the fuel cell 20.

The fuel gas supply system 4 of the fuel cell system 10 comprises a fuel gas supply unit 42, a fuel gas supply path 40, and a circulation route 51. The fuel gas supply unit 42 is a storage means for storing fuel gas (anode gas) such as hydrogen gas. The fuel gas supply path 40 is a flow passage means for supplying the fuel gas from the fuel gas supply unit 42 to the anode gas channel 25. The circulation route 51 is a flow passage means (circulation route) for circulating the fuel off-gas discharged from the anode gas channel 25 in the fuel gas supply path 40.

The fuel gas supply unit 42 is configured, for example, from a high pressure hydrogen tank, hydrogen storing alloy, reformer or the like. In this embodiment, the fuel gas supply unit 42 comprises a first fuel gas tank 42a and a second fuel gas tank 42b.

The fuel gas supply path 40 is mounted with a root valve 43, a pressure sensor 44, an ejector 45, and a shutoff valve 46. The root valve 43 is a shutoff valve for controlling the flow of fuel gas from the fuel gas supply unit 42. The pressure sensor 44 is a pressure detection means for detecting the relatively high pressure of the fuel gas in the piping which is downstream of the root valve 43 and upstream of the ejector 45. The ejector 45 is a regulating valve for regulating the fuel gas pressure within the circulation route 51. The shutoff valve 46 is a valve means for controlling the supply/non-supply of fuel gas to the fuel cell 20.

The circulation route 51 comprises a shutoff valve 52, a gas-liquid separator 53, an exhaust valve 54, and a hydrogen pump 55. The shutoff valve 52 is a valve means for controlling the supply/non-supply of the fuel off-gas from the fuel cell 20 to the circulation route 51. The gas-liquid separator 53 is a separation means for eliminating the moisture contained in the fuel off-gas. The exhaust valve 54 is a valve means for discharging the moisture that was separated by the gas-liquid separator 53 to the outside. The hydrogen pump 55 comprises a motor not shown, and is a drive means as a forced circulator which compresses the fuel off-gas that was subjected to pressure loss upon passing through the anode gas channel 25 and raises it to an appropriate gas pressure, and circulates such fuel off-gas in the fuel gas supply path 40. Based on the drive of the hydrogen pump 55, the fuel off-gas converges with the fuel gas supplied from the fuel gas supply unit 42 at the junction of the fuel gas supply path 40 and the circulation route 51, and is supplied to the fuel cell 20 and reused. Note that the hydrogen pump 55 is mounted with a rotational speed sensor 57 for detecting the rotational speed of the hydrogen pump 55, and pressure sensors 58, 59 for detecting the pressure of the circulation route before and after the hydrogen pump 55.

In addition, the circulation route 51 is piped with an exhaust flow passage 61 in a branched manner. The exhaust flow passage 61 is provided with a purge valve 63 and a diluter 62. The exhaust flow passage 61 is a discharge means for discharging the fuel off-gas discharged from the fuel cell 20 to the outside of the vehicle. The purge valve 63 is a valve means for controlling the discharge of the fuel off-gas. As a result of opening and closing the purge valve 63, the circulation within the fuel cell 20 is repeated and the fuel off-gas with an increased impurity concentration is discharged outside, and deterioration of the cell voltage can be prevented by introducing new fuel gas. The diluter 62 is a dilution means for diluting the fuel off-gas with oxidation off-gas to a concentration where no oxidation reaction will occur, and, for example, is a hydrogen concentration reduction device.

Meanwhile, the oxidation gas supply system 7 of the fuel cell system 10 is piped with an oxidation gas supply path 71, and an oxidation off-gas exhaust passage 72. The oxidation gas supply path 71 a flow passage means for supplying oxidation gas (cathode gas) to the cathode gas channel 26. The oxidation off-gas exhaust passage 72 is a flow passage means for discharging the oxidation off-gas (cathode off-gas) discharged from the cathode gas channel 26.

The oxidation gas supply path 71 is provided with an air cleaner 74, and an air compressor 75. The air cleaner 74 is a suction means and filtration means for sucking in and filtering air from the atmosphere and supplying it to the oxidation gas supply path 71. The air compressor 75 is a drive means which compresses the sucked air with a motor not shown, and delivers the compressed air as oxidation gas to the cathode gas channel 26. The air compressor 75 is mounted with a pressure sensor 73 for detecting the air supply pressure of the air compressor 75.

A humidifier 76 is provided between the oxidation gas supply path 71 and the oxidation off-gas exhaust passage 72. The humidifier 76 exchanges humidity between the oxidation gas supply path 71 and the oxidation off-gas exhaust passage 72, and raises the humidity of the oxidation gas supply path 71.

The oxidation off-gas exhaust passage 72 is provided with a pressure regulator 77, and a muffler 65. The pressure regulator 77 is a pressure regulating means that functions as a regulator for regulating the discharge pressure of the oxidation off-gas exhaust passage 72. The muffler 65 is a silencing means for absorbing the exhaust sound of the oxidation off-gas. The oxidation off-gas discharged from the pressure regulator 77 is branched. One of the branched oxidation off-gas flows into the diluter 62, and is mixed and diluted with the fuel off-gas retained in the diluter 62. The other branched oxidation off-gas is subjected to sound absorption by the muffler 65, and mixed with the gas that was mixed and diluted by the diluter 62 and discharged outside the vehicle.

Connected to the electric power system 9 of the fuel cell system 10 are a voltage sensor 84, a current sensor 86, fuel cell FC converter 90, a battery 91, a battery computer 92, an inverter 93, a vehicle driving motor 94, an inverter 95, a high voltage auxiliary machinery 96, a relay 97, and a battery DC-DC converter 98. These are the "related devices" in this embodiment.

A high voltage auxiliary machinery The FC converter 90 raises the output voltage of the fuel cell 20 connected to a primary terminal, and supplies this to an input terminal of the inverter 93 connected to a secondary terminal. When the generated output of the fuel cell 20 is insufficient, the battery converter 98 raises the output voltage of the battery 91 connected to the primary terminal and supplies this to the input terminal of the inverter 93 connected to the secondary terminal. Moreover, if surplus electricity is generated in the fuel cell 20, the surplus electricity of the fuel cell 20 is charged in the battery 91 via the FC converter 90 and the battery converter 98. In addition, if regenerative electric power is generated due to a braking operation to the vehicle driving motor 94, the regenerative electric power is charged in the battery 91 via the battery converter 98. The FC converter 90 comprises a relay 97 in the secondary terminal. The relay 97 is configured to maintain a conductive connection in a normal state. However, when a given impact is applied to the FC converter 90, the relay 97 becomes a blocked state, and is configured so that the secondary terminal of the FC converter 90 is electrically disconnected from the inverter 93, the inverter 95, and the battery converter 98.

Moreover, the secondary terminal of the FC converter 90 is configured to be electrically connected, via a power plug 283, to the input terminal of the inverter 93 and the inverter 95, and the secondary terminal of the battery converter 98.

The battery 91 is an electrical storage device for charging surplus electricity and regenerative electric power as a secondary battery. The battery computer 92 is a monitoring means for monitoring the charging state of the battery 91. The inverter 93 is a DC-AC conversion means for converting the direct current supplied via the FC converter 90 or the battery converter 98 into a three-phase alternating current, and supplying this to the vehicle driving motor 94 to be driven. The vehicle driving motor 94 is the main drive means of the fuel cell vehicle, and is a drive means that is driven by the three-phase alternating current from the inverter 93. The inverter 95 is a DC-AC conversion means for supplying an alternating current to the various high voltage machenery 96 configuring the fuel cell system 10. The high voltage auxiliary machinery 96 is a collective designation of the drive means that uses a motor other than the vehicle driving motor 94. Specifically, these are the motors of the coolant pump 35, the hydrogen pump 55, the air compressor 75 and the like.

The voltage sensor 84 is a voltage detection means for detecting the output voltage of the fuel cell 20, and the current sensor 86 is a current detection means for measuring the output current of the fuel cell 20. The voltage sensor 84 and the current sensor 86 are used for detecting the output voltage and output current of the fuel cell 20.

A high voltage auxiliary machinery Note that the vehicle driving motor 94 is mounted with a rotational speed sensor 99 for detecting the rotational speed of the vehicle driving motor 94. The vehicle driving motor 94 is mechanically joined with a front tire 101 as a wheel via a differential, and can covert the torque of the vehicle driving motor 94 into the driving power of the vehicle.

In addition, the fuel cell system 10 is mounted with a control unit 80 for controlling the overall power generation of the fuel cell system 10. The control unit 80 is configured as a general-purpose computer comprising a CPU (central processing unit), a RAM, a ROM, an interface circuit and the like not shown. The control unit 80 may be configured from one computer or configured from a plurality of computers that work together. The control unit 80 performs, for example, the following types of control, but is not limited thereto:

(1) to input a switch signal from the ignition switch 82 and start or stop the fuel cell system 10;

(2) to capture a detection signal of the gas pedal not shown and the shift position and a rotational speed signal from the rotational speed sensor 99 and computer control parameters such as the power required by the system as the required power supply amount;

(3) to control the rotational speed of the air compressor 75 so that the amount of oxidation gas that is supplied to the oxidation gas supply path 71 becomes an appropriate amount based on the relative value of the pressure of the oxidation gas supply path 71 detected by the pressure sensor 73;

(4) to control the opening of the pressure regulator 77 so that the amount of oxidation off-gas that is discharged from the oxidation off-gas exhaust passage 72 becomes an appropriate amount;

(5) to adjust the opening of the root valve 43 or regulate the regulated pressure of the ejector 45 so that the amount of oxidation gas that is supplied to the fuel gas supply path 40 becomes an appropriate amount based on the relative value of the pressures detected by the pressure sensors 44, 58, 59;

(6) to control the rotational speed of the hydrogen pump 55 and control the opening of the purge valve 63 so that the amount of fuel off-gas that is circulated in the circulation route 51 becomes an appropriate amount while monitoring the value of the rotational speed sensor 57;

(7) to control the opening and closing of the root valve 43, the shutoff valve 46, the shutoff valve 52 and the like according to the driving mode;

(8) to computer the circulation amount of the coolant based on the relative value of the coolant temperature detected by the temperature sensors 32, 36, and control the rotational speed of the coolant pump 35;

(9) to calculate the AC impedance of the fuel cell 20 based on the voltage value detected by the voltage sensor 84 and the current value detected by the current sensor 86, estimate and compute the water content of the electrolyte membrane, and control the scavenging amount when the vehicle is stopped; and

(10) to control the electric power system 9; for example, to control the FC converter 90, the inverters 93 and 95, the vehicle driving motor 94, the high voltage auxiliary machinery 96, and so on.

(Arrangement of Fuel Cell System In Vehicle)

The configuration of the fuel cell assembly in Embodiment 1 is now explained with reference to FIG. 2 to FIG. 10.

Figure 2:
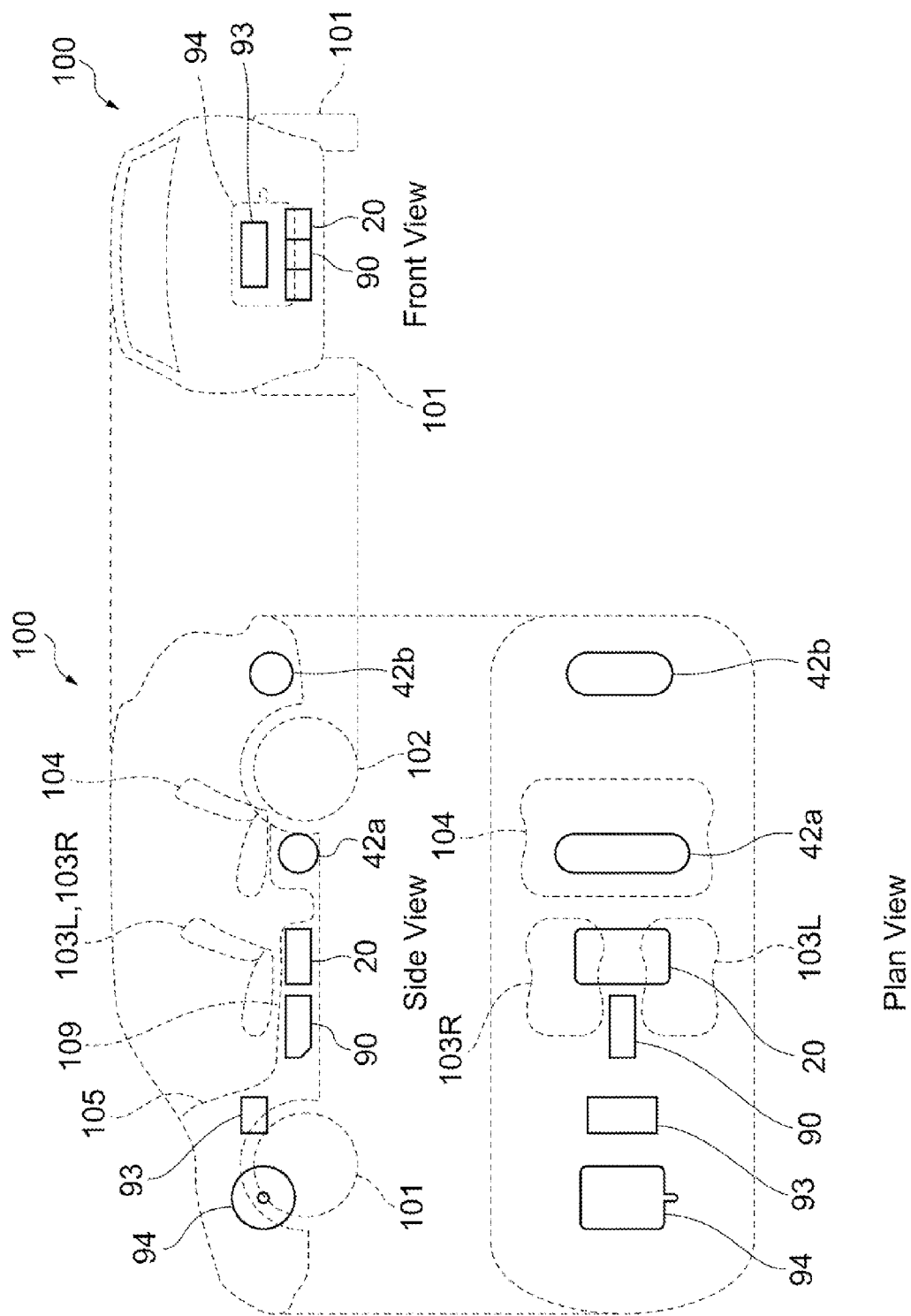
FIG. 2 is a side view, a plan view and a front view explaining the arrangement of the respective units of the fuel cell system in the vehicle in Embodiment 1.

FIG. 2 shows the arrangement of the primary devices of the fuel cell system in the fuel cell vehicle. FIG. 2 shows a side view, a plan view, and a front view.

In the following embodiments, for the sake of convenience, the direction (rightward direction in the side view and plan view of FIG. 2) in which the vehicle 100 advances when the gear is shifted to "drive" is referred to as "front" (front direction, front side), and the direction (leftward direction in the side view and plan view of FIG. 2) in which the vehicle 100 advances when the gear is shifted to "reverse" is referred to as "rear" (rear direction, rear side). In addition, the lateral direction (upward direction or downward direction in the plan view of FIG. 2, and rightward or leftward direction in the front view of FIG. 2) that is of a horizontal plane relative to the front direction or the rear direction is referred to as the "side" or "lateral direction." Moreover, of the foregoing "lateral direction," the right-side direction facing the "front direction" is referred to as "right," and the left-side direction is referred to as "left." Moreover, of the height direction of the vehicle 100, the upward direction (upward direction in the side view and front view of FIG. 2) is referred to as "up" (upward direction, upper side), and the downward direction (direction of the vehicle 100 toward the road, and downward direction in the side view and front view of FIG. 2) is referred to as "down" (downward direction, lower side).

As shown in the side view and plan view of FIG. 2, the outline of the vehicle 100, the front tire 101, the rear tire 102, the front seat 103, and the rear seat 104 is shown with a dashed line. As shown in the side view of FIG. 2, a dashboard 105 which partitions the compartment where the passenger is to climb in is shown with a bold dashed line. The respective devices configuring the fuel cell system 10 are shown with a solid line. In FIG. 2, among the respective devices configuring the fuel cell system 10, in particular the arrangement of the fuel cell 20, the FC converter 90, the inverter 93, the vehicle driving motor 94, the first fuel gas tank 42a, and the second fuel gas tank 42b is illustrated.

As shown in the side view of FIG. 2, the respective components of the fuel cell system 10 are arranged at the bottom part of the vehicle 100 that is partitioned by the dashboard 105. The fuel cell 20 is disposed on the lower side of the front seat 103 at approximately the center portion of the entire vehicle length in the front-back direction and of the vehicle width in the left-right direction of the vehicle. Since the FC converter 90 is directly connected to an output terminal of the fuel cell 20, it is disposed adjacent to the fuel cell 20 and on the front side of the fuel cell 20. In order to widen the feet area of the passenger, the dashboard 105 is provided with a tunnel part 109 protruding in a front-back direction between a right-side front seat 103R and a left-side front seat 103L. The FC converter 90 is housed in the tunnel part 109. The vehicle driving motor 94 is disposed in the vicinity of the front tire 101 and on the front side of the vehicle 100 in order to drive the front tire 101. The inverter 93 is disposed in the vicinity of the vehicle driving motor 94 in order to supply power to the vehicle driving motor 94. The first fuel gas tank 42a is disposed on the rear side of the fuel cell 20 in order to supply fuel gas to the fuel cell 20. The second fuel gas tank 42b is provided further on the rear side of the first fuel gas tank 42a.

As described above, the fuel cell 20 and the FC converter 90 are provided near the approximate center of the vehicle 100 in a plan view, and provided on the lower side of the dashboard 105 in a side view. A frame extending in the front-back direction of the vehicle 100 and a cross member extending in the width direction of the vehicle 100 are arranged so as to encompass the fuel cell 20 and the FC converter 90. Thus, the fuel cell 20 and the FC converter 90 are provided at a position where they will not easily break even with a collision from the lateral direction in addition to a collision from the foreside of the vehicle 100. In addition, since the fuel cell 20 comprises a configuration as the fuel cell assembly of the present invention as described later, it possesses extremely high tolerance against collision from the lateral direction.

Note that, in the ensuing explanation, the fuel cell 20 is mounted on the vehicle 100 in the mode of the fuel cell assembly 200, and the FC converter 90 is mounted on the vehicle 100 in the mode of the converter assembly 250, respectively.

Moreover, let it be assumed that the various member explained below are configured from metal materials with given rigidity; for example, aluminum, SUS, steel or the like. The metal materials may be arbitrarily selected from the perspective of ease of workability, strength, tolerance, weight, cost and so on. The metal materials may be subjected to well-known hardening treatment such as quenching or alloying.

Figure 3:
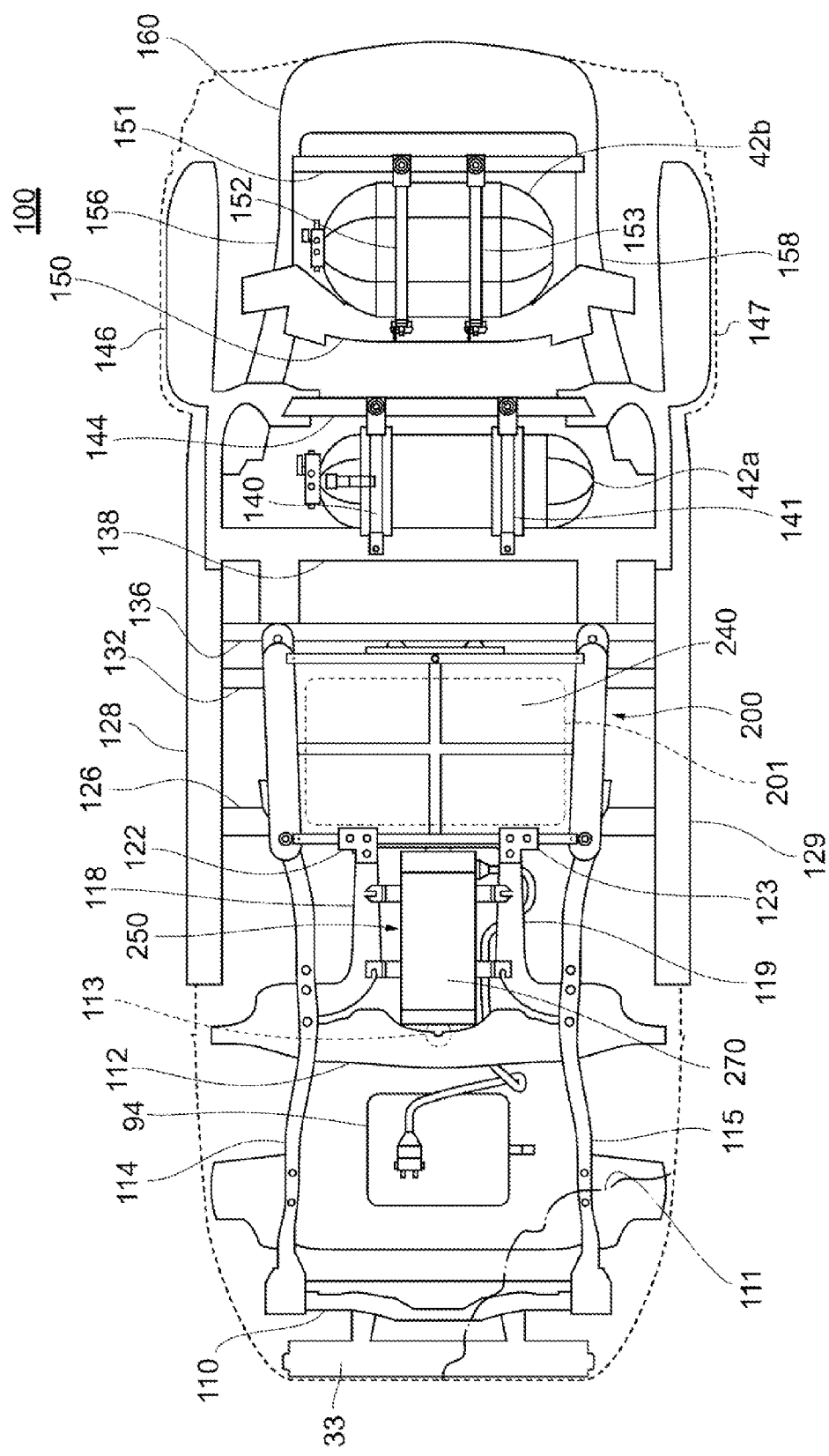
FIG. 3 is a bottom view of the vehicle explaining the arrangement of the fuel cell assembly in Embodiment 1.

FIG. 3 shows a bottom view of the bottom face of the vehicle including the arrangement of the fuel cell assembly in Embodiment 1.

As shown in FIG. 3, a floor panel 111 is provided across the entire bottom part of the vehicle 100. In the front part of the vehicle 100, front frames 114 and 115 are provided in an extending manner at the bottom part, and form the framework structure of the front part of the vehicle 100. A front cross member 110 is provided at the foremost part of the front frames 114 and 115, and the radiator 33 shown in FIG. 1 is additionally mounted. A front suspension member 112 is provided at the rear side of the front cross member 110. The front suspension member 112 is fastened to the front frames 114 and 115. The vehicle driving motor 94 shown in FIG. 1 and FIG. 2 is disposed in the area surrounded by the front cross member 110 and the front suspension member 112.

The fuel cell assembly 200 is fastened to the front frame 114 and the front frame 115 at the front side of the vehicle, and fastened to a third cross member 136 at the rear side of the vehicle. As shown in FIG. 3, a pair of sub-frame 118 and sub-frame 119 is extending from the rear of the fastened position of the front suspension member 112 of the front frames 114 and 115 toward the fuel cell assembly 200. The ends of the sub-frames 118 and 119 are fastened to the protective structure 220 (explained with reference to FIG. 5 onward) of the fuel cell assembly 200 together with a bracket 122 and a bracket 123. A converter assembly 250 (explained with reference to FIG. 5 onward) is disposed between the pair of sub-frames 118 and 119. The converter assembly 250 is fastened to the sub-frames 118 and 119. Note that, in FIG. 3, the illustration of the protective panel 240 (explained with reference to FIG. 7 onward) provided to the underside of the protective structure 220 is omitted.

A side rocker member 128 and a side rocker member 129 are provided to the side face of the vehicle 100. A first cross member 126, a second cross member 132, and a third cross member 136 are placed across and fastened to the side rocker members 128 and 129 from the front side to the rear side, and provide a rigid structure against the impact from the lateral direction of the vehicle 100. The fuel cell assembly 200 relates to the present invention and, in a plan view, is disposed between the first cross member 126 and the third cross member 136 in the front-back direction and disposed between the front frame 114 and the front frame 115 in the width direction.

A rear rocker member 146 and a rear rocker member 147 are extending from the rear side of the side rocker members 128 and 129 to the periphery of the rear tire 102 at the rear part of the vehicle 100. A fourth cross member 138, a fifth cross member 150, and a rear cross member 160 are placed across and fastened to the rear rocker members 146 and 147 from the front side to the rear side, and provide a tolerant structure against the impact from the lateral direction of the rear of the vehicle. In the rear rocker members 146 and 147, a sub-cross member 144 is placed across the rear side of the fourth cross member 138, and a first fuel gas tank 42a is disposed between the fourth cross member 138 and the sub-cross member 144. A binder 140 and a binder 141 are provided between the fourth cross member 138 and the sub-cross member 144 so as to fix the first fuel gas tank 42a. A sub-cross member 151 is placed across the rear part of the fifth cross member 150, and a second fuel gas tank 42b is disposed between the fifth cross member 150 and the sub-cross member 151. A binder 152 and a binder 153 are provided between the fifth cross member 150 and the sub-cross member 151 so as to fix the second fuel gas tank 42b.

Note that, in the foregoing configuration, a notch-shaped deformation promotion part 113 is provided to the center rear side of the front suspension member 112. When impact of the collision from the foreside of the vehicle is applied and the front suspension member 112 comes in contact with the converter assembly 250, the deformation promotion part 113 easily deforms and bends and absorbs the energy. Thus, it is thereby possible to inhibit the converter assembly 250 from moving backward any farther.

Figure 4:
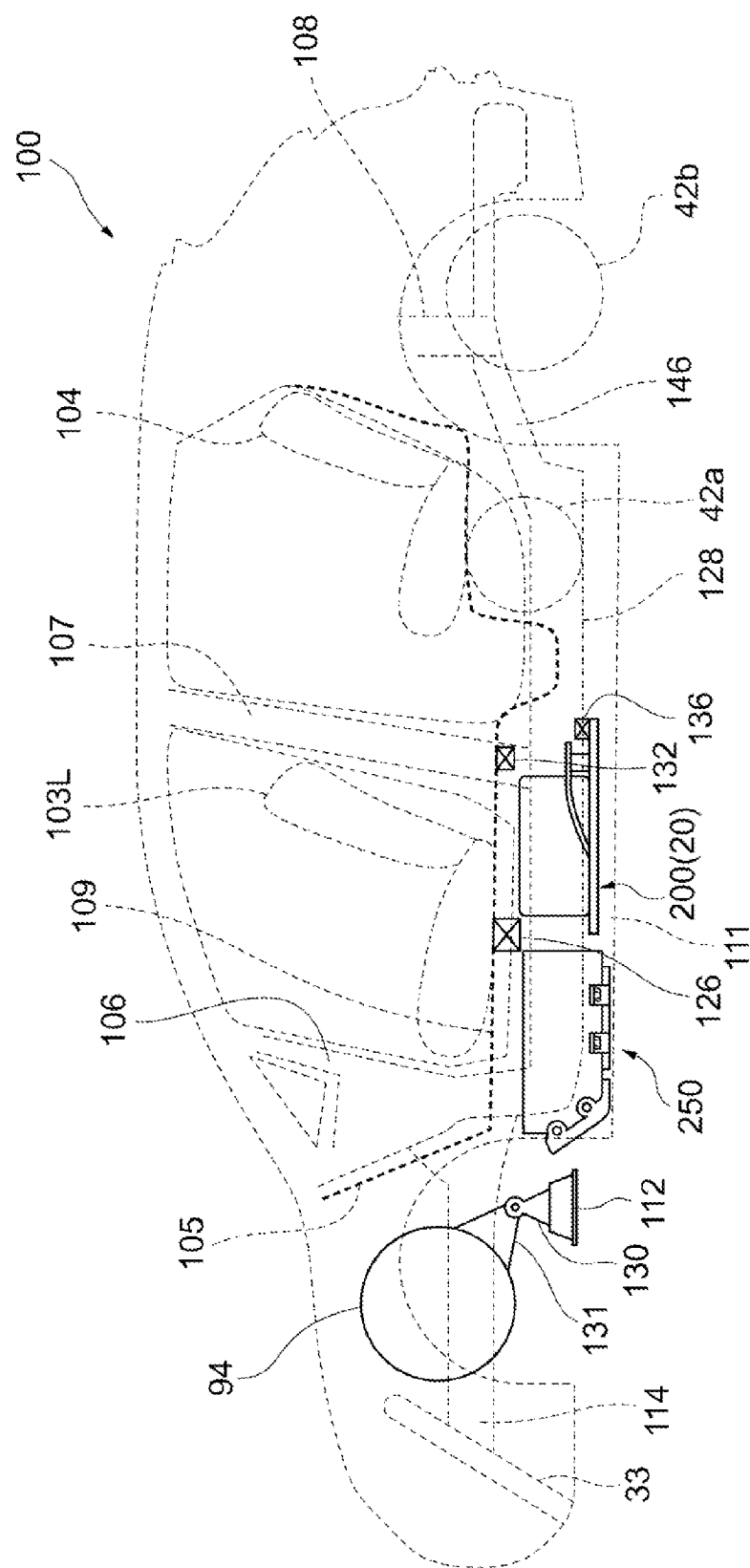
FIG. 4 is a side view of the vehicle explaining the arrangement of the fuel cell assembly in Embodiment 1.

FIG. 4 shows a side view of the vehicle including the arrangement of the fuel cell assembly in Embodiment 1.

As shown in FIG. 4, the vehicle driving motor 94 is fastened to a motor mount 130 provided to the front suspension member 112 via a mounting rubber 131. When there is impact of the collision from the foreside of the vehicle, the structure causes the vehicle driving motor 94 to move backward, and consequently causes the front suspension member 112 to move backward. As explained above with reference to FIG. 2, the fuel cell assembly 200 and the converter assembly 250 are disposed within the tunnel part 109 which is a part of the dashboard 105 and which is provided between the front seats 103R and 103L. A front pillar 106 is erected from the foreside of the side rocker members 128 and 129, and a center pillar 107 is erected from the center thereof. A rear pillar 108 is erected from the center of the rear rocker member 146. As explained above with reference to FIG. 3, the side rocker members 128 and 129 configure a framework structure of surrounding the fuel cell assembly 200 based on the first cross member 126, the second cross member 132, and the third cross member 136.

Note that, in the foregoing configuration, the respective frames, members, and pillars all comprise a structure in which relief is provided to a plate, or a rigidity reinforced structure combining a plurality of such plates. As a result of adopting this kind of structure, high mechanical strength can be provided with light weight.

(Structure of Fuel Cell Assembly)

Figure 5:
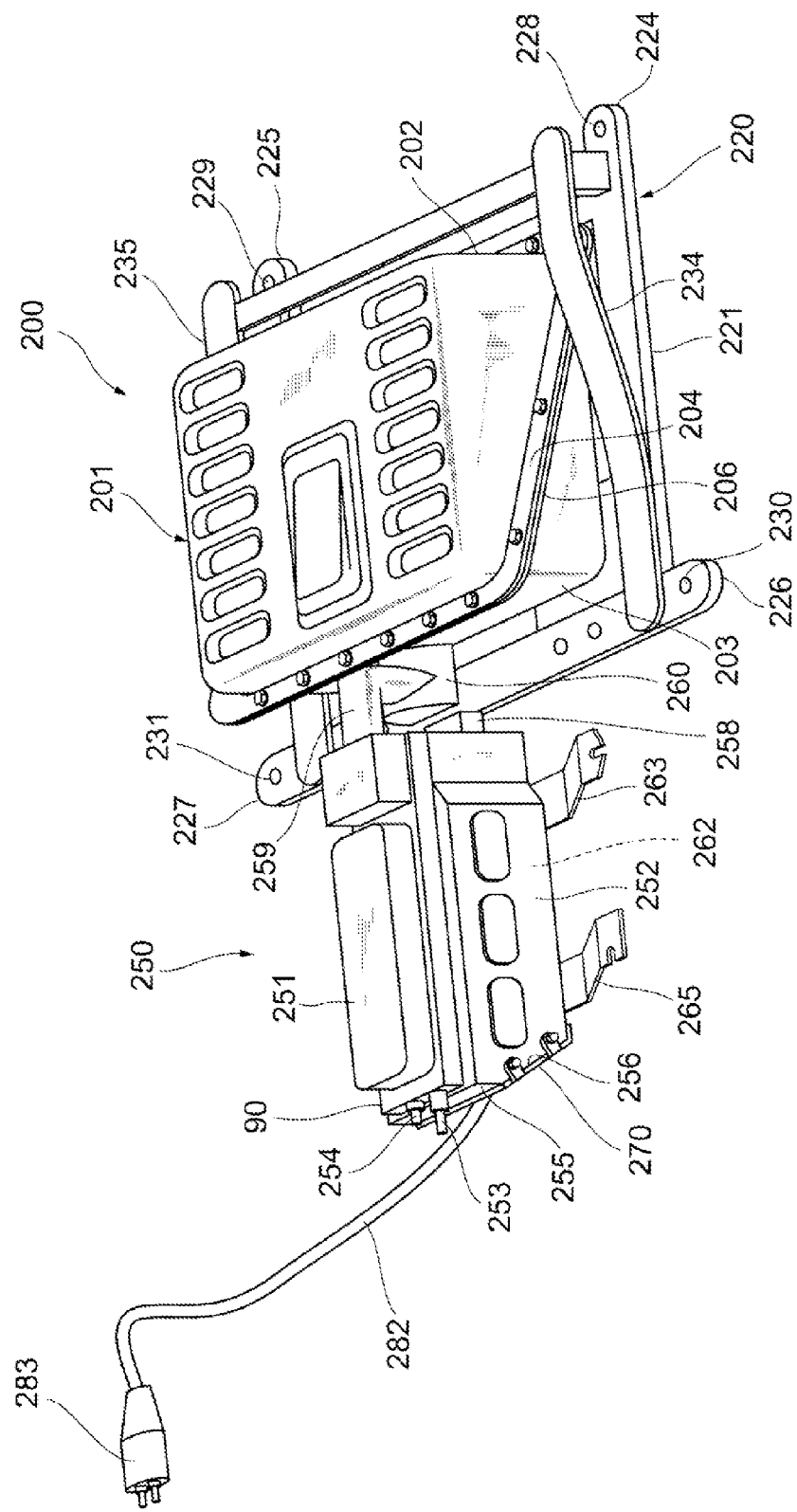
FIG. 5 is a perspective view of the fuel cell assembly and converter assembly in Embodiment 1.

The structure of the fuel cell assembly 200 is now explained in detail. FIG. 5 shows a perspective view of the fuel cell assembly 200 and the converter assembly 250 in Embodiment 1. In the vehicle 100 shown in FIG. 2 to FIG. 4, the converter assembly 250 is arranged on the front side and the fuel cell assembly 200 is arranged on the rear side. When referring to the "front side" or "rear side" in the ensuing explanation, such reference is based on the premise that the components are in a state of being arranged in that direction.

As shown in FIG. 5, the fuel cell assembly 200 is configured by the fuel cell unit 201 being arranged in the protective structure 220. The fuel cell unit 201 is configured by aligning and fastening an upper flange 204 and a lower flange 206 of an upper housing 202 and a lower housing 203. The protective structure 220 is provided with a sloping frame 234 and a sloping frame 235 on two opposing sides of the frame structure 221. An attaching portion 226 and an attaching portion 227 are provided at a corner on the front side of the frame structure 221, and an attaching portion 224 and an attaching portion 225 are provided at a corner on the rear side. The protective structure 220 is fastened to the front frames 114 and 115 shown in FIG. 3 at the attaching portions 226 and 227, and fastened to the third cross member 136 shown in FIG. 3 at the attaching portions 224 and 225.

Here, as shown in FIG. 5, the protective structure 220 is mounted on the vehicle 100 shown in FIG. 2 to FIG. 4 so that the sloping frame 234 or 235 faces the vehicle width direction. The fuel cell unit 201 is also mounted on the protective structure 220 so that, of the upper flange 204 and the lower flange 206, the inclined portion faces the vehicle width direction. Here, as shown in FIG. 5, the fuel cell unit 201 is mounted on the protective structure 220 so that the sloping direction of the upper flange 204 and the lower flange 206 becomes oppositely oriented to the sloping direction of the sloping frames 234 and 235 of the protective structure 220. As a result of adopting this kind of configuration, the fuel cell assembly 200 in this embodiment has a dramatically stronger structure against impact from the vehicle lateral direction. This will be described in detail later.

The converter assembly 250 shown in FIG. 5 is configured from an upper housing 251 and a lower housing 252. A coolant inlet 253 and a coolant outlet 254 are provided to the front side of the FC converter 90. A power cable 259 is provided to the rear side of the FC converter 90, and electrical connection with the fuel cell 20 provided within the fuel cell unit 201 is enabled with a terminal connector 260. Moreover, a power cable 282 provided with a plug 283 at its tip is connected to the rear part of the FC converter 90, and configured so that it can supply power to the vehicle driving motor 94.

In the FC converter 90, a bottom face protecting plate 262 is provided at the underside of the lower housing 252, and a front face protecting plate 270 is provided to a forward inclined face 256 of the lower housing 252. Based on the bottom face protecting plate 262, the configuration is able to protect the FC converter 90 from the impact of the collision (road surface interference) from the lower side of the vehicle 100. Based on the front face protecting plate 270, the configuration is able to protect the FC converter 90 from the front suspension member 112 which moves backward due to a collision from the foreside of the vehicle 100. Moreover, the converter assembly 250 is fastened to the sub-frames 118 and 119 shown in FIG. 3 based on the attaching portion 263 and the attaching portion 265 provided to the bottom face protecting plate 262.

(Fuel Cell Unit 201)

Figure 6:
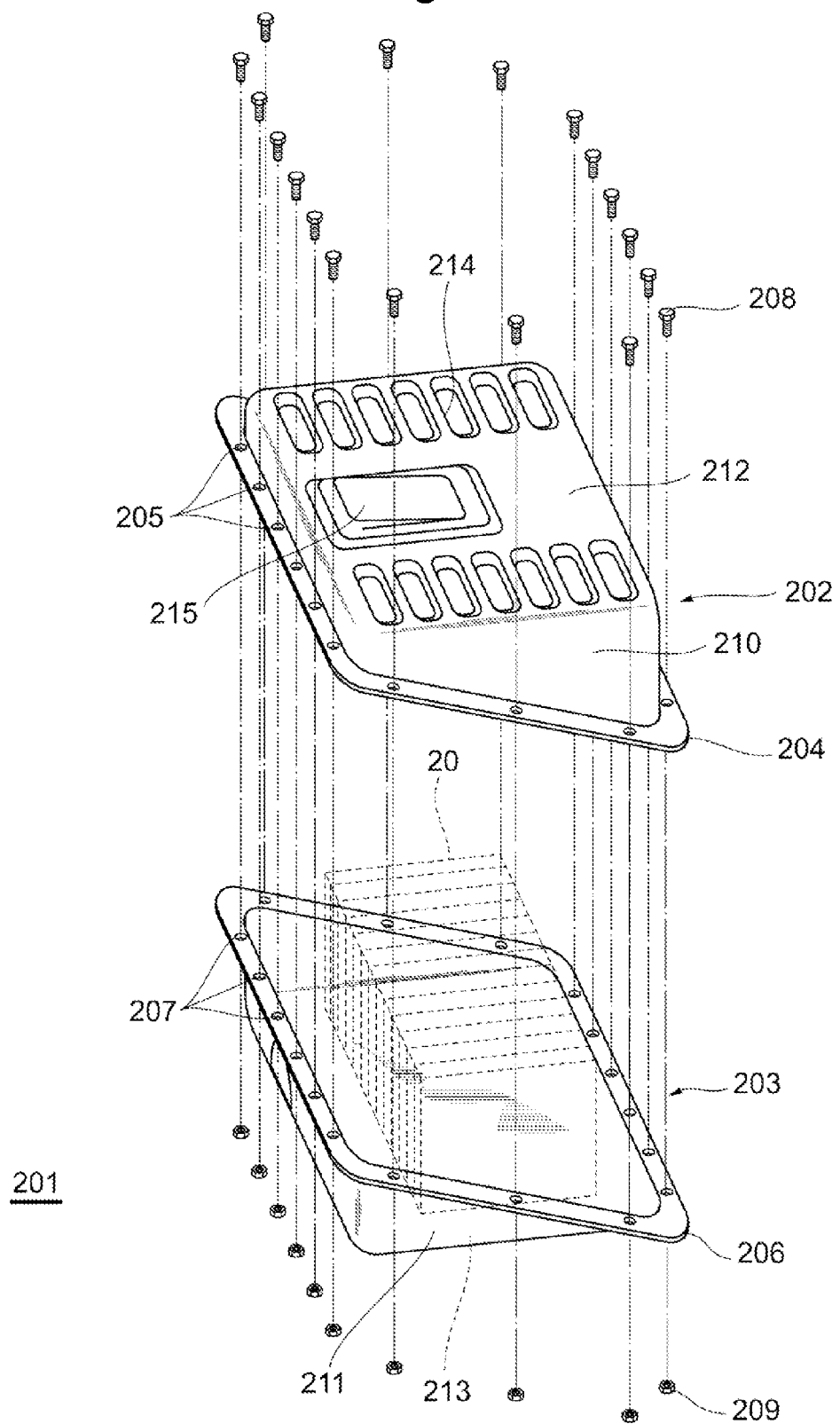
FIG. 6 is a perspective view explaining the structure of the fuel cell unit in Embodiment 1.

FIG. 6 shows a perspective view explaining the structure of the fuel cell unit 201 in Embodiment 1. In FIG. 6, in order to simplify the explanation, illustration of the piping for supplying/discharging oxidation gas and fuel gas from the fuel cell 20 and terminals for extracting the generated output of the fuel cell 20 is omitted.

As shown in FIG. 6, the fuel cell unit 201 is configured by housing the fuel cell 20 in an internal space obtained by combining the upper housing 202 covering the upper side and the lower housing 203 covering the lower side. The upper housing 202 is provided with an upper flange 204 which encompasses the four side faces 210 surrounding the top face 212. The lower housing 203 is provided with a lower flange 206 which encompasses the four side faces 211 surrounding the bottom face 213. When the upper housing 202 and the lower housing 203 are combined as shown in FIG. 6, a fastener hole 205 provided to the upper flange 204 becomes aligned with a fastener hole 207 provided to the lower flange. Thus, the fuel cell unit 201 is assembled by housing the fuel cell 20 internally, combining the upper housing 202 and the lower housing 203, and fastening the upper flange 204 and the lower flange 206 with a fastening member. As the fastening member, for example, as shown in FIG. 6, bolts 208 and nuts 209 are used. The upper housing 202 and the lower housing 203 are fastened by inserting the bolts 208 through the fastener hole 205 of the upper flange 204 and the fastener hole 207 of the lower flange 206 and fastening the nuts 209 from the other side.

A plurality of relief shapes 214 and a ventilation window 215 are provided to a top face 212 of the fuel cell unit 201. The relief shapes 214 are also provided to a bottom face 213 of the fuel cell unit 201, although not shown. As a result of comprising the relief shapes 214, the mechanical strength of the fuel cell unit 201 itself is improved. Screw holes for mounting the protective structure 220 described later are provided to the four corners of the bottom face 213 of the fuel cell unit 201.

Here, as shown in FIG. 6, the upper flange 204 and the lower flange 206 are inclined in the two facing side faces 210 and 211. Specifically, the upper flange 204 and the lower flange 206 are formed so as to diagonally cut across the side faces 210 and 211 of the fuel cell unit 201. Generally speaking, the mechanical strength of a portion formed with a flange will increase. Thus, the mechanical strength of the side faces 210 and 211 to which the upper flange 204 and the lower flange 206 are formed diagonally is improved in comparison to cases where a flange is not formed. In this embodiment, the configuration is able to further improve the mechanical strength against the collision from the lateral direction by disposing the fuel cell unit 201 in the following protective structure 220.

(Protective Structure 220)

Figure 7:
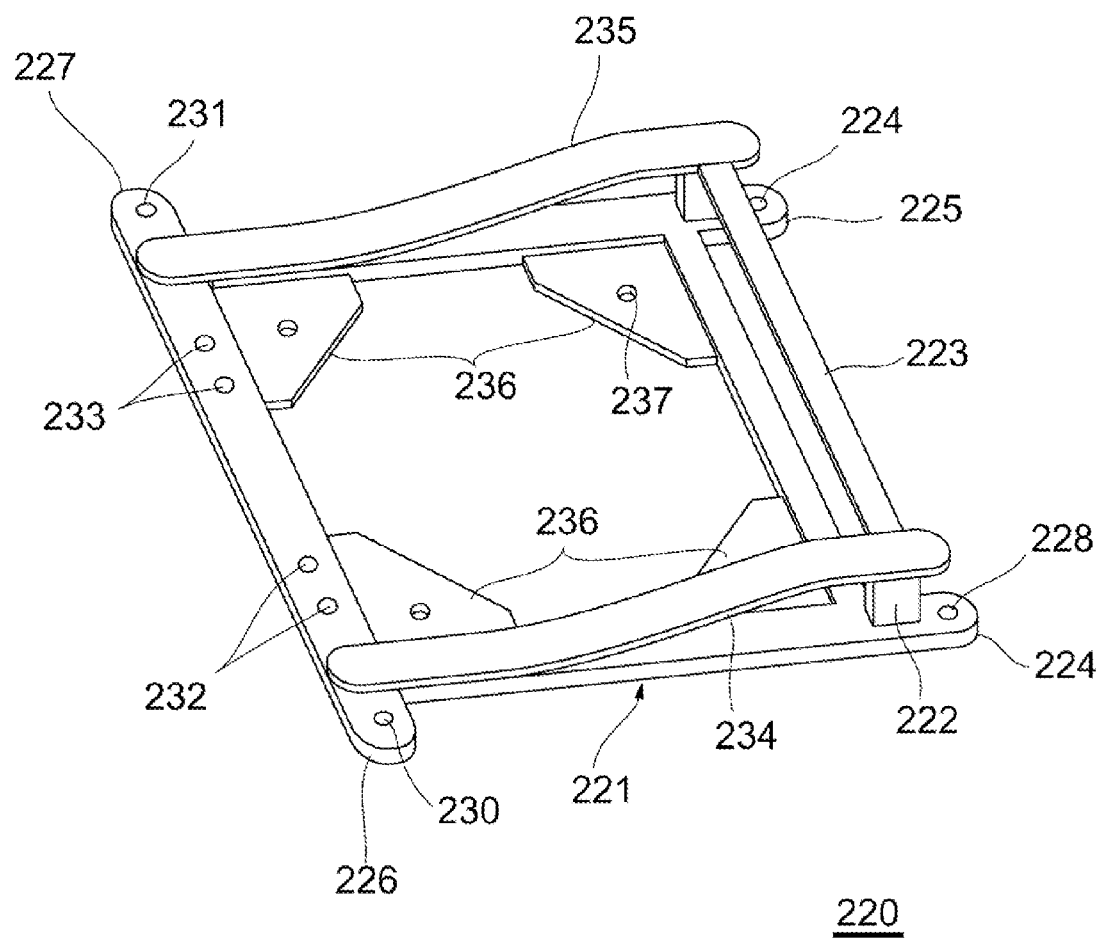
FIG. 7 is a perspective view of the fuel cell assembly in Embodiment 1.

FIG. 7 shows a perspective view of the protective structure 220 in Embodiment 1. As shown in FIG. 7, the protective structure 220 has a frame structure to which the foregoing fuel cell unit 201 is mounted, and has a frame structure 221 which encompasses the fuel cell unit 201. Columnar members 222 are respectively erected at the two corners at the vehicle rear side of the frame structure 221. The sloping frames 234 and 235 described above are placed and provided obliquely across the apex of the respective columnar members 222 from each of the two corners at the vehicle front side of the frame structure 221. A reinforcing frame 223 is placed across the two columnar members 222.

Moreover, of the frame structure 221, the side member at the front side of the vehicle is provided with a plurality of fastener holes 232 and fastener holes 233 for fastening the frame structure 221 to the ends of the sub-frames 118 and 119 shown in FIG. 3. An attaching portion 226 and an attaching portion 227 are provided to the two corners at the front side of the frame structure 221, and a fastener hole 230 and a fastener hole 231 are formed. An attaching portion 224 and an attaching portion 225 are provided to the two corners at the rear side of the frame structure 221, and a fastener hole 228 and a fastener hole 229 are formed.

Moreover, a mounting seat 236 for fastening the fuel cell unit 201 is provided to the respective corners formed by the side members configuring the frame structure 221. A fastener hole 237 is provided to the mounting seat 236. The protective panel 240 shown in FIG. 8 can be mounted from the lower side (back side) of the mounting seat 236.

(Assemblage of Fuel Cell Assembly 200)

Figure 8:
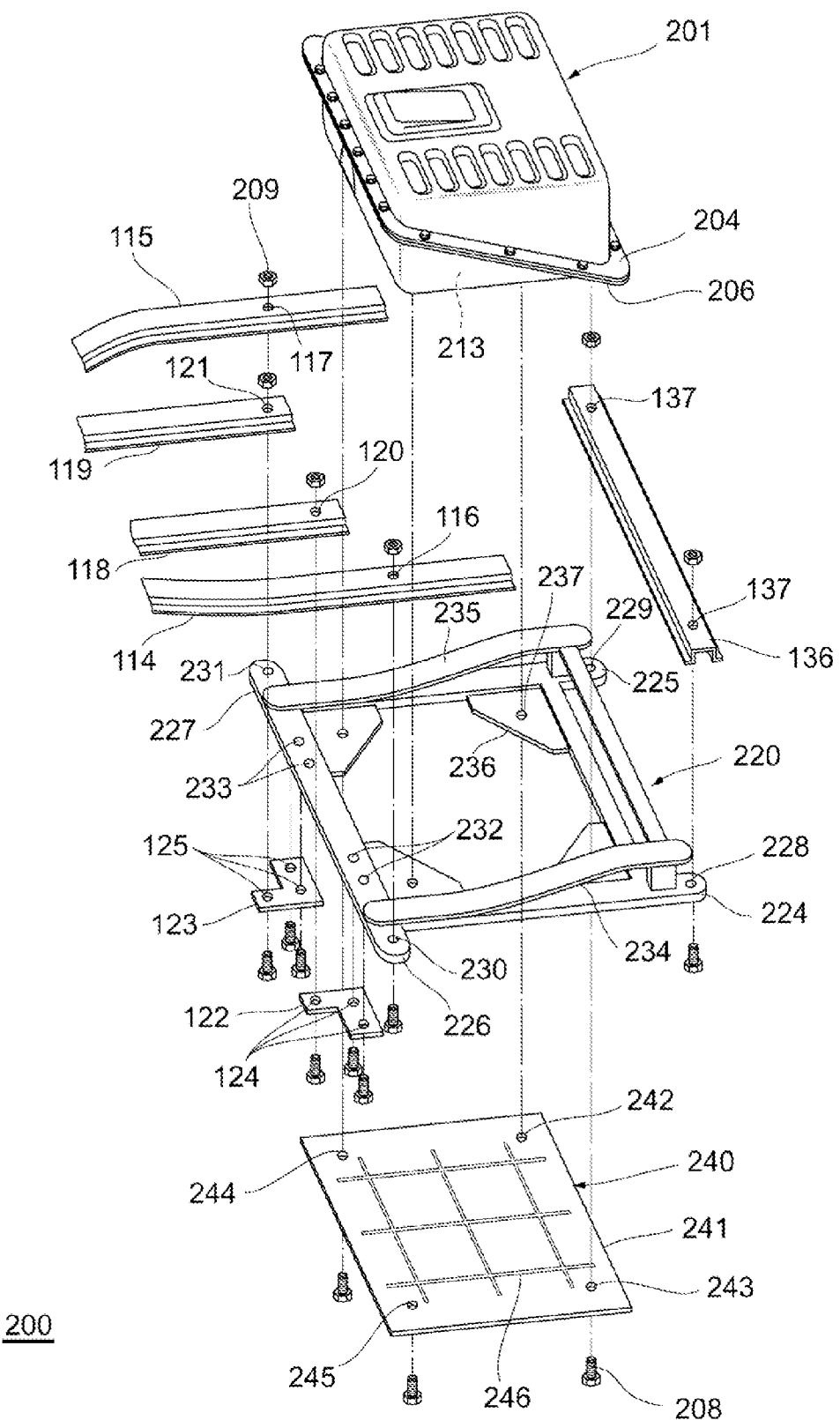
FIG. 8 is a diagram explaining the assemblage of the fuel cell assembly in Embodiment 1.

FIG. 8 shows a diagram explaining the assemblage of the fuel cell assembly 200 in Embodiment 1. As shown in FIG. 8, the fuel cell assembly 200 is configured by the fuel cell unit 201 being disposed on the top face and the protective panel 240 being disposed on the bottom face of the foregoing protective structure 220.

The protective panel 240 is a protection means for protecting the fuel cell unit 201 from the collision (road surface interference) form the bottom face of the vehicle shown in FIG. 2. As the material of the protective panel 240, lightweight metal such as aluminum is preferably used for weight-saving, but it may also be a material that was subjected to hardening treatment for tolerating the impact from strong road surface interference. In this embodiment, the protective panel 240 is reinforced and configured by mixing carbon cross fiber 246 to an aluminum panel body 241. Fastener holes 242 to 245 for fastening the protective panel 240 to the protective structure 220 are provided to the four corners of the protective panel 240.

As shown in FIG. 8, the fuel cell unit 201 is mounted from the upper side of the protective structure 220, and the protective panel 240 is mounted from the lower side of the protective structure 220. Specifically, the fuel cell unit 201 is mounted so that the bottom face 213 of the fuel cell unit 201 comes in contact with the top face side of the mounting seat 236 of the protective structure 220. The protective panel 240 is fitted into the inside of the frame structure 221 until it comes in contact with the back face of the mounting seat 236. The bolt 208 as the fastening member is inserted from the lower side of the protective panel 240 through the respective fastener holes 242 to 245 provided to the protective panel 240, and through the fastener hole 237 provided to the mounting seat 236. In addition, the bolt 208 is screwed into the screw hole provided to the bottom face 213 of the fuel cell unit 201 so as to integrally form the fuel cell unit 201 and the protective panel 240 with the protective structure 220.

The protective structure 220 that was integrally formed as described above is mounted on the vehicle 100 shown in FIGS. 2 to 4. Foremost, the attaching portions 226 and 227 of the protective structure 220 at the front side of the vehicle are mounted on the front frames 114 and 115. The attaching portion 226 is fastened by inserting the bolt 208 as a fastening member from one side through its fastener hole 230 and the fastener hole 116 of the front frame 114, and screwing the nut 209 from the other side. The attaching portion 227 is fastened by inserting the bolt 208 from one side through its fastener hole 231 and the fastener hole 117 of the front frame 115, and screwing the nut 209 from the other side.

Moreover, as shown in FIG. 8, the side member of the protective structure 220 at the front side of the vehicle front side is fastened firmly to the sub-frames 118 and 119 with the brackets 122 and 123 as the reinforcing member. The fastener hole 232 provided to the side member of the protective structure 220 at the front side of the vehicle is positioned so that it is aligned with the fastener hole 120 of the sub-frame 118 and the fastener hole 124 of the bracket 122. Subsequently, the bolt 208 as a fastening member is inserted from one side, the nut 209 is screwed from the other side, and the side member is thereby fastened to an end of the sub-frame 118. Moreover, the fastener hole 233 provided to the side member of the protective structure 220 at the front side of the vehicle is positioned so that it is aligned with the fastener hole 121 of the sub-frame 119 and the fastener hole 125 of the bracket 123. Subsequently, the bolt 208 is inserted from one side, the nut 209 is screwed from the other side, and the side member is thereby fastened to an end of the sub-frame 119. Since the brackets 122 and 123 are used as the reinforcing member, the fastening of the sub-frames 118 and 119 and the protective structure 220 can be performed in an extremely firm manner. In addition, the brackets 122 and 123 may also be fixed by being welded with the protective structure 220. By adopting the method of fixation based on welding, even firmer fastening can be realized in comparison to the case of fixing the fastening members using bolts and nuts.

Moreover, the attaching portions 224 and 225 provided to the corners of the protective structure 220 at the rear side of the vehicle are fastened to the third cross member 136. Specifically, the fastener holes 228 and 229 of the attaching portions 224 and 225 and the fastener hole 137 of the third cross member 136 are positioned to be aligned, and fastened by inserting the bolt 208 from one side and screwing the nut 209 from the other side.

Here, particularly in this embodiment, with the fuel cell unit 201, side faces 210 and 211 mounted with the sloping portions of the upper flange 204 and the lower flange 206 are mounted on the mounting seat 236 so as to face the width direction of the vehicle. As a result of the face provided with the flange facing the width direction of the vehicle, it is possible to increase the impact resistance against the collision from the lateral direction of the fuel cell unit 201.

Moreover, with the fuel cell unit 201, the sloping portions of the upper flange 204 and the lower flange 206 are fastened to the protective structure 220 in a direction of become lower from the vehicle front side to the vehicle rear side. Meanwhile, the sloping frames 234 and 235 of the protective structure 220 are disposed so that they become higher from the front part of the vehicle toward the rear part of the vehicle. Thus, the fuel cell unit 201 is mounted on the protective structure 220 so that the sloping direction of the flange in the fuel cell unit 201 becomes opposite to the sloping direction of the sloping frames 234 and 235 of the protective structure 220. Accordingly, as a result of arranging the sloping structural bodies, which are arranged as a position to face each other, to be mutually opposite directions, it is possible to further improve the mechanical strength of the fuel cell assembly 200. This is because an intersecting structure with extremely high rigidity is created against the impact.

(Arrangement of Fuel Cell Related Component)

Figure 9:
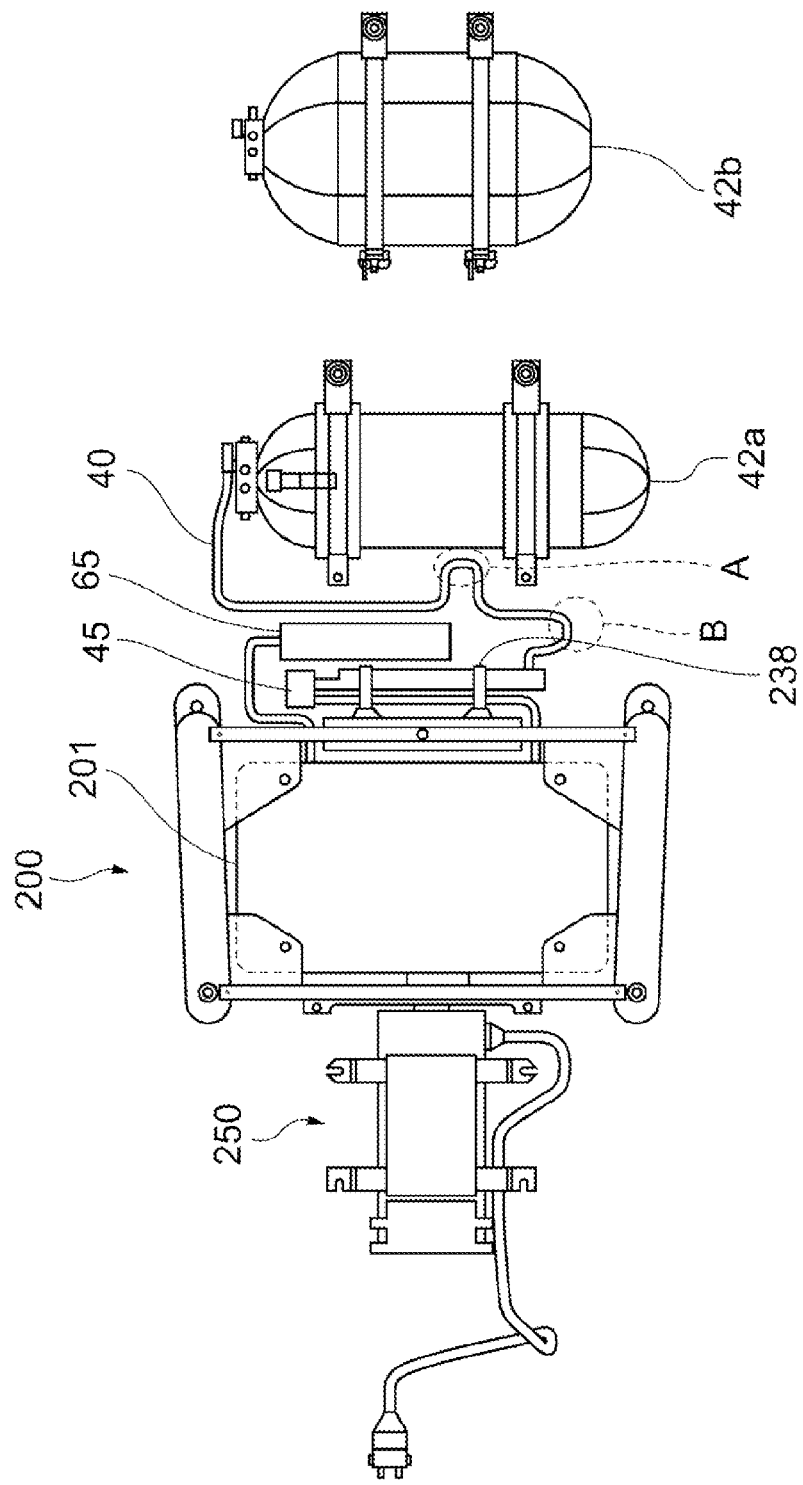
FIG. 9 is a diagram explaining the arrangement of the related components of the fuel cell in Embodiment 1.

FIG. 9 shows a diagram explaining the arrangement of the related components of the fuel cell in Embodiment 1. FIG. 9 is a diagram extracting the fuel cell assembly 200, the converter assembly 250, the first fuel gas tank 42a, and the second fuel gas tank 42b from the bottom view of the vehicle shown in FIG. 3.

As shown in FIG. 9, related devices which are strongly related to the fuel cell 20 are arranged at the vehicle rear side of the fuel cell assembly 200. Specifically, these related devices are members which are preferably arranged near the fuel cell unit 201, and, for example, are devices in which the length of the passage to the fuel cell 20 is preferably shortened. For example, the ejector 45 and the shutoff valves 46 and 52 shown in FIG. 1, and an accumulator not shown are examples of the related devices.

In FIG. 9, the related devices such as the ejector 45 and the accumulator are mounted at the rear part of the protective structure 220 with the binder 238. Since these related devices need to be disposed in the vicinity of the fuel cell unit 201, they are fastened as a part of the fuel cell assembly 200. Contrarily, the first fuel gas tank 42a and the second fuel gas tank 42b may be separated from the fuel cell assembly 200. Preferably, the connection of the fuel gas, oxidation gas, or electric power system between the related devices provided apart from the fuel cell assembly 200, and the fuel cell assembly 200 is provided with "surplus length". The "surplus length" refers to a surplus portion in which a curvature or the like is formed in the fuel gas supply path, oxidation gas supply path, or power supply line. Due to the existence of this kind of surplus length, it is possible to prevent the rupture of the fuel gas supply path, oxidation gas supply path, or power supply line even if there is any change to the distance between the devices during the collision of the vehicle, and thereby inhibit the inconveniences associated with such rupture.

In the example of FIG. 9, a surplus length portion A and a surplus length portion B surrounded with a dashed line are formed in the fuel gas supply path 40. If impact of the collision is applied from the lateral direction of the vehicle 100, the fuel cell assembly 200 moves integrally, and the related devices of the fuel cell unit 201 and the fuel cell assembly 200 also move together. Meanwhile, the first fuel gas tank 42a and the second fuel gas tank 42b move only slightly during a collision. Thus, the relative distance between the fuel cell assembly 200 and the foregoing fuel gas tanks will change. Nevertheless, even if the relative distance changes as described above, according to this embodiment, the change in the relative distance is absorbed since the surplus length portion A and the surplus length portion B are formed on the fuel gas supply path 40.

(Function of Structure In Embodiment 1)

Figure 10A:
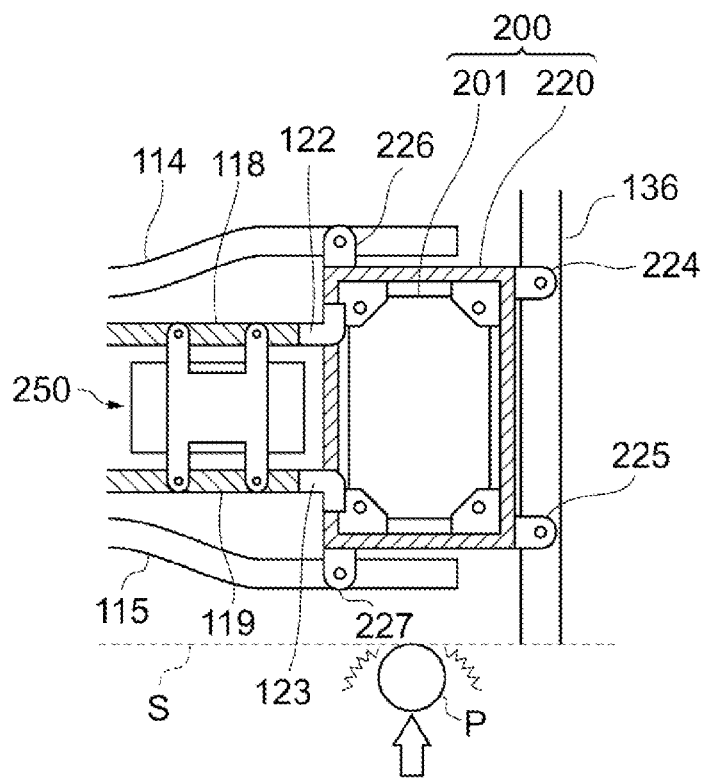
FIG. 10A is a diagram showing a case of side face collision.
Figure 10B:
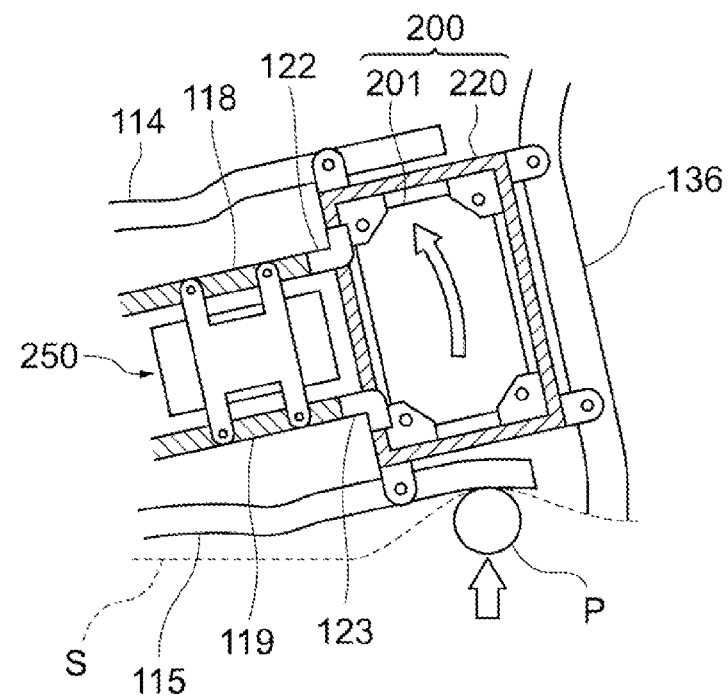
FIG. 10B is a diagram showing a case where the object has reached the position of the fuel cell unit.

The functions of the fuel cell assembly 200 in Embodiment 1 are now explained with reference to FIG. 10. FIG. 10A is a schematic diagram when an object P collides with the side face of the vehicle 100, and FIG. 10B is a schematic diagram when the object P reaches the position of the fuel cell unit 201. Both diagrams show cases when viewed from the bottom face side of the vehicle. Illustration of the protective panel 240 is omitted.

As shown in FIG. 10A, when the object P collides with the side face of the vehicle 100, it foremost comes in contact with the body S. If the impact of the collision is strong, the body S deforms and the object P enters the inside of the vehicle. If the impact of the collision is too strong, it is not possible to absorb the impact of the collision only with the front frame 115, and the object P reaches the position of the fuel cell unit 201. Depending on the shape and height of the colliding object P, there are cases where the protection of the front frame 115 does not function and the object directly approaches the fuel cell unit 201. Specifically, as shown in FIG. 10B, there are cases where the front frame 115 deforms, and the third cross member 136 deforms.

Here, as shown in FIG. 10B, with the fuel cell assembly 200 of Embodiment 1, since the fuel cell unit 201 is mounted on the protective structure 220, the approaching object P foremost comes in contact with the protective structure 220. Thus, it is possible to inhibit the impact from being directly applied to the fuel cell unit 201. Here, according to this embodiment, the fuel cell assembly 200 is fixed near the ends of the front frames 114 and 115 and the sub-frames 118 and 119. In addition, since the brackets 122 and 123 are also used, the joint of the sub-frames 118 and 119 and the fuel cell assembly 200 is firm. Thus, when the impact is applied to the protective structure 220, the fuel cell assembly 200 moves like a pendulum with the sub-frames 118 and 119 as the pivot (diagonal arrow of FIG. 10B). Specifically, the fuel cell unit 201 moves, while causing the peripheral frames to deform, toward the side that is opposite to the approaching side of the object P together with the protective structure 220 without any breakage to itself. The impact of the collision is absorbed during this process. Thus, the impact of the collision can be effectively absorbed while preventing damage to the fuel cell unit 201.

In particular, according to the protective structure 220 of Embodiment 1, the sloping frames 234 and 235 are provided. Thus, even when the object P approaches at the height of the fuel cell unit 201, the object P will come in contact at the position of either the sloping frame 234 or 235, and it is thereby possible to prevent the object P from directly colliding from the lateral direction of the fuel cell unit 201.

Moreover, according to the fuel cell unit 201 of Embodiment 1, flanges are provided to the side faces 210 and 211 at a sloping direction that is different from the sloping frame 234 or 235 of the protective structure 220. Thus, even if the sloping frame 234 or 235 becomes deformed due to the impact of the collision or the object P continues inward without coming in contact with the sloping frame 234 or the 235, it will come in contact with the flange itself of the fuel cell unit 201, and the impact can be alleviated thereby. Thus, the impact to the fuel cell 20 can be alleviated at the brink.

In addition, according to the fuel cell unit 201 of Embodiment 1, relief shapes 214 are provided to the top face 212 and bottom face 213 thereof. Thus, since the mechanical strength of the top face 212 and bottom face 213 provided with the relief shapes 214 will increase even further, even if the object P causes the flange to deform and continues inward, the impact to the internal fuel cell 20 can be alleviated based on the mechanical strength of the housing itself of the fuel cell unit 201.

In addition, according to the fuel cell assembly 200 of Embodiment 1, the front part of the protective structure 220 is firmly fastened to the sub-frames 118 and 119 by the brackets 122 and 123. Thus, even if the impact of the collision is applied to the protective structure 220, the fastening of the protective structure 220 and the sub-frames 118 and 119 will not become unfastened. Since the protective structure 220 is fastened to the ends of the sub-frames 118 and 119, the protective structure 220 that is subjected to the impact of the collision from the lateral direction will move like a pendulum, while maintaining its outer shape, as shown with the diagonal arrow in FIG. 10B. Based on this kind of movement, torsional deformation works on the front frames 114 and 115 and the third cross member 136, and the energy of the collision can be effectively absorbed thereby.

In addition, the flanges of the foregoing sloping frames 234 and 235 and the fuel cell unit 201 are of an extremely simple and lightweight structure in comparison to forming a protective structure with a thick wall using a metal material, is able to provide a sufficient structure for protecting the fuel cell, and yields high cost performance.

Moreover, according to the fuel cell assembly 200 of Embodiment 1, a protective panel 240 is provided to the back side of the protective structure 220. Thus, in addition to the protective panel 240 increasing the mechanical strength of the protective structure 220 itself, it is possible to protect the fuel cell unit 201 from the impact of the road surface interference from the bottom face side of the vehicle.

(Embodiment 2)

Embodiment 2 of the present invention relates to a modified example of the fuel cell assembly.

Figure 11:
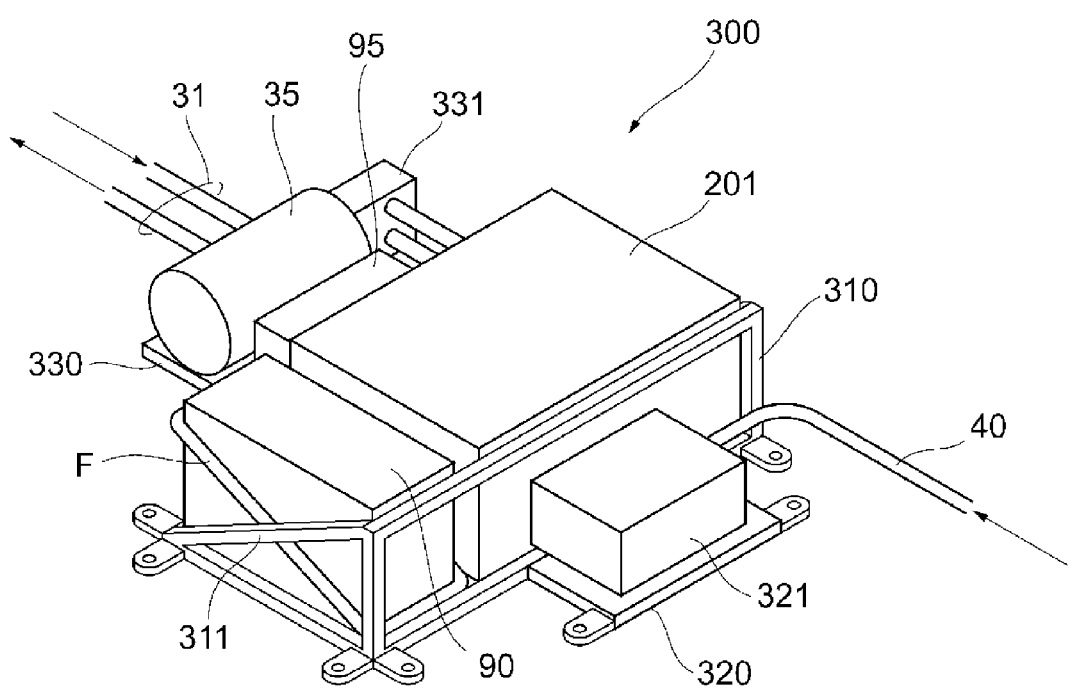
FIG. 11 is a perspective view of the fuel cell assembly in Embodiment 2.
Figure 12:
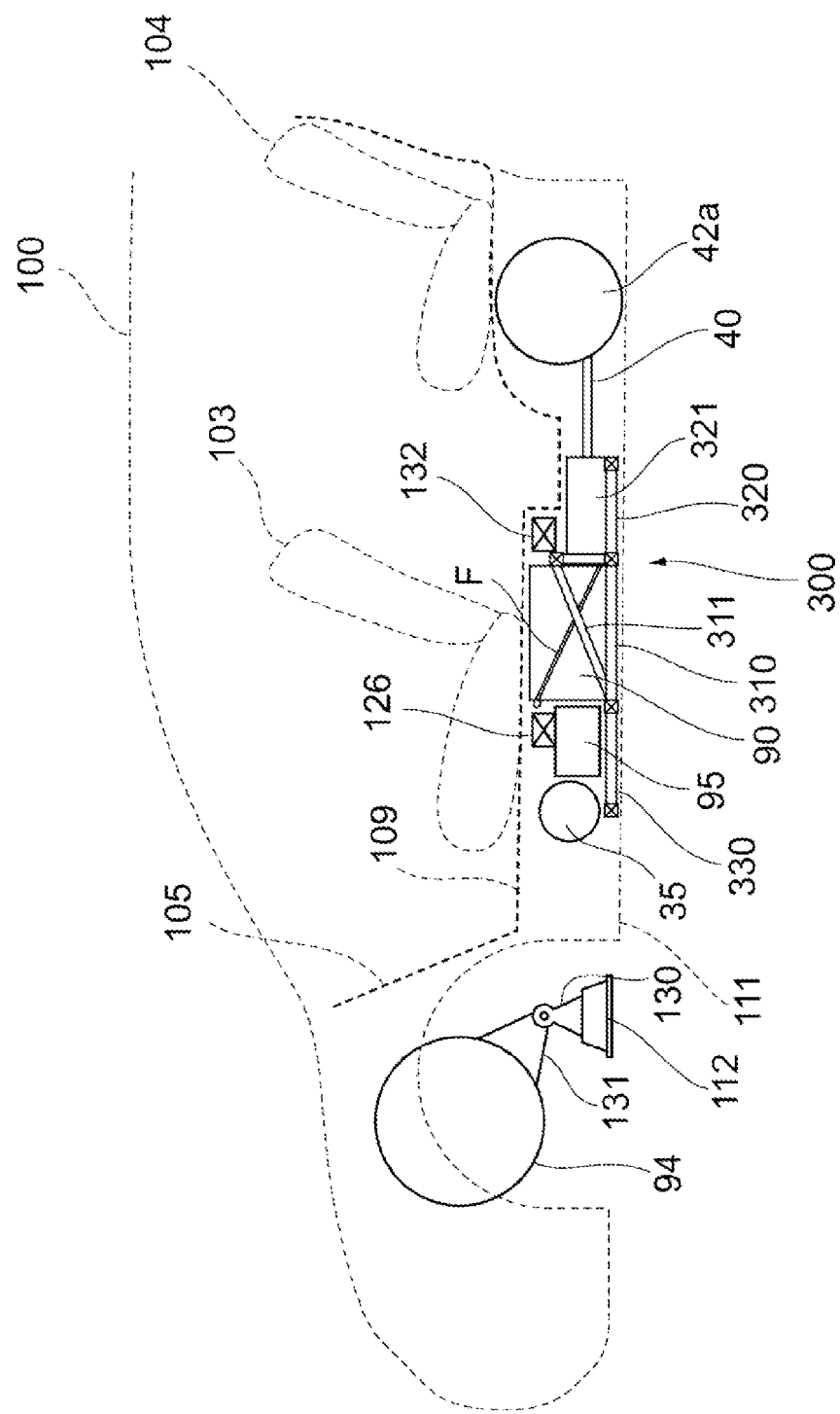
FIG. 12 is a side view of the vehicle explaining the arrangement of the fuel cell assembly in Embodiment 2.
Figure 13:
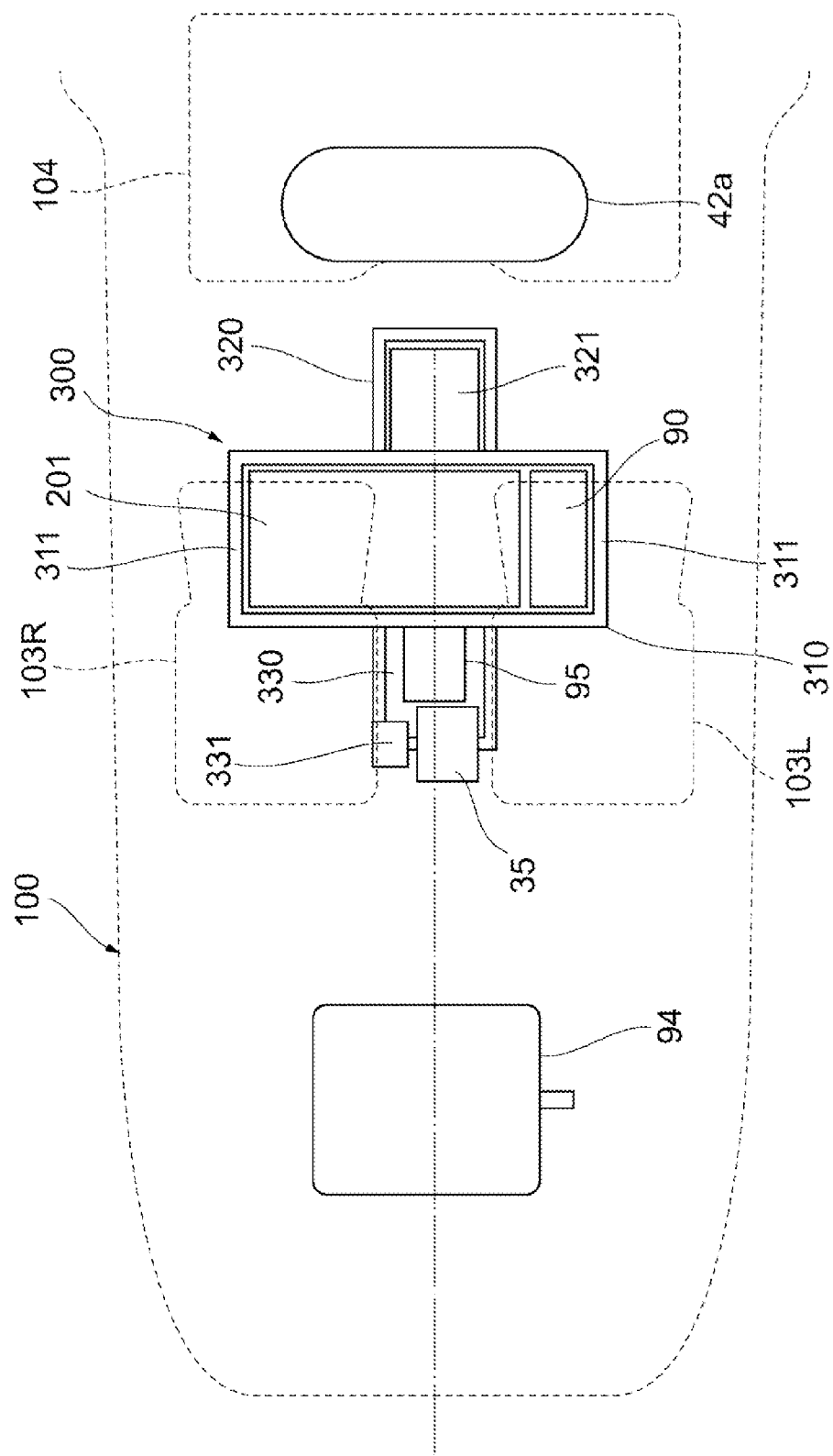
FIG. 13 is a bottom view of the vehicle explaining the arrangement of the fuel cell assembly in Embodiment 2.

FIG. 11 shows a perspective view of the fuel cell assembly 300 in Embodiment 2. FIG. 12 shows a side view of the vehicle explaining the arrangement of the fuel cell assembly 300 in Embodiment 2. FIG. 13 shows a bottom view of the vehicle explaining the arrangement of the fuel cell assembly 300 in Embodiment 2.

As shown in FIG. 11 and FIG. 13, the fuel cell assembly 300 of Embodiment 2 is configured by a plurality of fuel cell related devices; the fuel cell unit 201 and the FC converter 90 in this modified example, being aligned in the width direction of the vehicle. However, the fuel cell related devices are not limited to the foregoing combination, and the configuration may be such that other related devices such as the inverter are mounted together with the fuel cell unit 201. The protective structure 310 is formed in a shape that is large enough to house the fuel cell unit 201 and the FC converter 90. With the protective structure 310, the rear-side structure 320 is provided to the rear side and the front-side structure 330 is provided to the front side in an integral manner.

As shown in FIG. 11 to FIG. 13, a housing part 321 for housing the related devices of the fuel cell unit 201 is mounted on the rear-side structure 320. The front-side structure 330 is mounted with the coolant pump 35, the inverter 95, and the related device housing part 331 shown in FIG. 1. Here, as shown with the side view of FIG. 12, in Embodiment 2, the rear-side structure 320 is disposed at the rear part of the fuel cell unit 201. Thus, the leg rest portion of the rear seat 104 of the dashboard 105 is formed slightly higher.

As shown in FIG. 11 and FIG. 12, the protective structure 310 is provided with a sloping frame 311 as in Embodiment 1. Moreover, the FC converter 90 is provided with an inclined flange structure F as in Embodiment 1. The fuel cell unit 201 is also provided with, although not shown, a flange structure configured from the combination of the upper flange 204 and the lower flange 206 as in Embodiment 1. The FC converter 90 is disposed so that its inclined flange structure F intersects with the sloping frame 311 of the protective structure 310. The fuel cell unit 201 is disposed so that its flange structure intersects with the sloping frame 311 of the protective structure 310.

Note that, in Embodiment 2, the fuel cell unit 201 and the FC converter 90 are mounted on one protective structure 310 as separate components. However, it is also possible to adopt a related device assembly structure as shown in FIG. 14A and FIG. 14B by housing the fuel cell 20 and the FC converter 90 in the same housing.

Figure 14A:
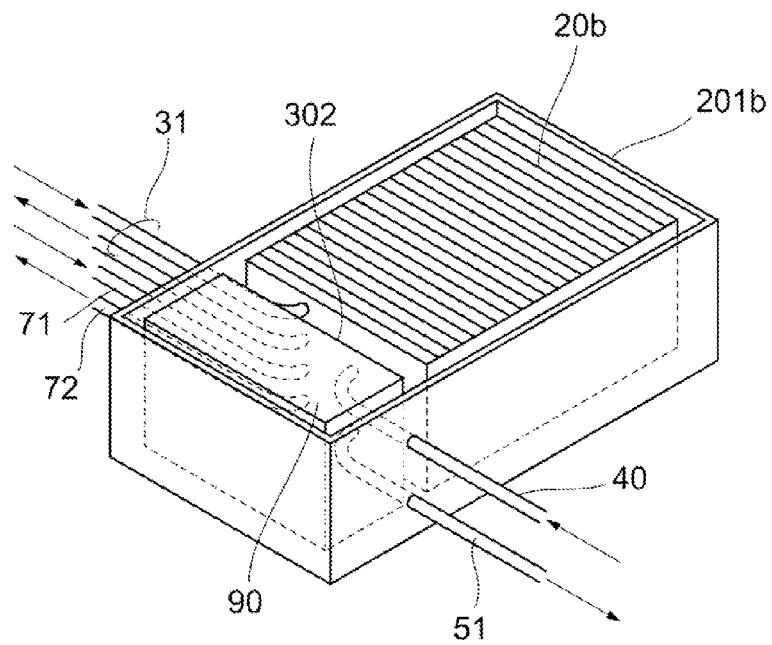
FIG. 14A is a mode where the fuel cell stack is stacked vertically.

FIG. 14A is an example of a related device assembly 301b configuring a fuel cell stack by stacking cells in the longitudinal direction of the housing. FIG. 14B is an example of a related device assembly 301c configuring a fuel cell stack by stacking cells in the width direction of the housing.

With the fuel cells 20b of the stack structure shown in FIG. 14A, it is possible to stack numerous cells since the cells can be stacked in the longitudinal direction of the housing, and provide relatively high generated voltage. Nevertheless, with this kind of related device assembly 301b, the supply of oxidation gas and discharge of oxidation off-gas to the fuel cell 20b, the supply of fuel gas and discharge of oxidation off-gas, the supply and discharge of coolant need to be performed from a space 302 between the fuel cell 20b and the FC converter 90. Thus, the piping structure becomes complex, and there is a drawback in that the pressure loss of the flowing gas is relatively high due to the complex piping structure.

Figure 14B:
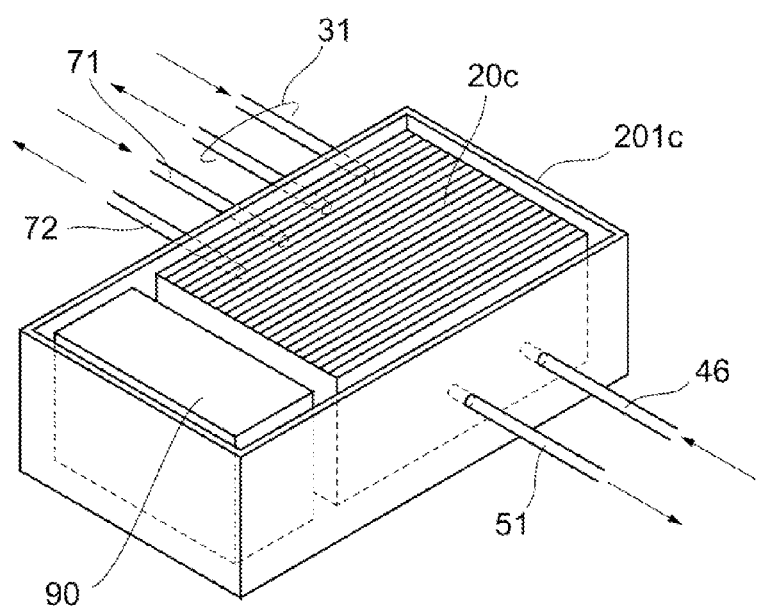
FIG. 14B is a mode where the fuel cell stack is stacked horizontally.

With the fuel cells 20c of the stack structure shown in FIG. 14B, since the cells can only be stacked in the width direction of the housing, only relatively low generated voltage can be provided, and there is a drawback in that the amount of pressure rise caused by the FC converter 90 is high. Nevertheless, the piping of oxidation gas, oxidation off-gas, fuel gas, fuel off-gas, and coolant can be provided at a position requiring the supply/exhaust thereof on the side face of the housing. Thus, with this kind of related device assembly 301c, there is an advantage in that the piping structure is simple and the pressure loss of the flowing gas is relatively low. The stack structure of the fuel cell 20 should be decided upon giving consideration to the foregoing advantages and drawbacks of both modes.

Note that, in the related device assembly 301b or 301c, the related device that can be housed in the housing together with the fuel cell 20 is not limited to the FC converter 90. The configuration may be such that, in substitute for or in addition to the FC converter 90, the battery converter 98, the inverter 93, the inverter 95, or other related devices may be housed together with the fuel cell 20.

As described above, according to Embodiment 2, even if the impact of the collision is applied from the width direction of the vehicle of FIG. 13, it is possible to protect the FC converter 90 from the impact of the collision in addition to the fuel cell 20 mounted inside the fuel cell unit 201. Specifically, the object that enters due to the collision is prevented from further entry based on the frame structure and sloping frame 311 of the protective structure 310. In addition, the impact of the collision is alleviated in the course of moving the side that is opposite to the colliding direction of the object.

Moreover, according to Embodiment 2, the related devices of the fuel cell 20 are mounted on the rear-side structure 320 and the coolant pump 35 and the related devices are mounted on the front-side structure 330. Thus, during a collision, since these related devices move together with the protective structure 310, it is possible to inhibit the disconnection of the piping between the related devices.

In addition, according to Embodiment 2, even if the object approaches a specific point on the side face of the fuel cell unit 201, it is possible to prevent the entry of the object using the sloping frame 311. Even if the object further continues inward, the FC converter 90 can be protected from the entry of the object based on the inclined flange structure F provided to the FC converter 90. Moreover, the fuel cell unit 201 can be protected from the entry of the object based on the flange structure provided to the fuel cell unit 201.

Specifically, according to Embodiment 2, since the configuration houses a plurality of fuel cell related devices in the protective structure 310, such plurality of fuel cell related devices can be protected integrally.

(Other Modified Examples)

The present invention is not limited to the foregoing embodiments, and may be modified variously.

For example, in Embodiment 1, although the sloping frames 234 and 235 of the protective structure 220 were provided to two side faces facing the left-right width direction, the configuration is not limited thereto. If it is necessary only to prepare for the impact of the collision from one direction of the side faces, the sloping frame may be provided only on the side face that may be subjected to the impact. Contrarily, the sloping frame may also be provided to the side face of the front side or side face of the rear side of the fuel cell unit 201.

Moreover, the modes of the sloping frames 234 and 235 of the protective structure 220 are not limited to the foregoing embodiment, and may be modified. For example, if the weight limitation can be tolerated, an intersecting structure (X structure) or a slit structure (I structure) may be used in substitute for the sloping frame structure.

INDUSTRIAL APPLICABILITY

The fuel cell assembly of the present invention is not limited to the use in a fuel cell vehicle in which a fuel cell system is mounted on a vehicle, and can be applied to any and all mobile objects that need to protect the fuel cell from impact. As such mobile objects, there are trains, ships, aircrafts, submarines and the like. This is because, if the fuel cell assembly of the present invention is provided, it is possible to effectively protect the fuel cell, as the heart, from the impact of a collision regardless of the mode of such mobile object. In particular, even with a mobile object with a weight limitation, by applying the present invention, it is possible to effectively protect the fuel cell from impact by using a lightweight structure.

REFERENCE SIGNS LIST

3 . . . coolant supply system, 4 . . . fuel gas supply system, 7 . . . oxidation gas supply system, 9 . . . electric power system, 10 . . . fuel cell system, 20, 20b, 20c . . . fuel cell, 21 . . . polyelectrolyte film, 22 . . . anode electrode, 23 . . . cathode electrode, 24 . . . membrane electrode assembly, 25 . . . anode gas channel, 26 . . . cathode gas channel, 31 . . . cooling path, 32 . . . temperature sensor, 33 . . . radiator, 34 . . . valve, 35 . . . coolant pump, 36 . . . temperature sensor, 40 . . . fuel gas supply path, 42 . . . fuel gas supply unit, 42a . . . first fuel gas tank, 42b . . . second fuel gas tank, 43 . . . root valve, 44 . . . pressure sensor, 45 . . . ejector, 46 . . . shutoff valve, 51 . . . circulation route, 52 . . . shutoff valve, 53 . . . gas-liquid separator, 54 . . . exhaust valve, 55 . . . hydrogen pump, 57 . . . rotational speed sensor, 58, 59 . . . pressure sensor, 61 . . . exhaust flow passage, 62 . . . diluter, 63 . . . purge valve, 65 . . . muffler, 71 . . . oxidation gas supply path, 72 . . . oxidation off-gas exhaust passage, 73 . . . pressure sensor, 74 . . . air cleaner, 75 . . . air compressor, 76 . . . humidifier, 77 . . . pressure regulator, 80 . . . control unit, 82 . . . ignition switch, 84 . . . voltage sensor, 86 . . . current sensor, 90 . . . fuel cell DC-DC converter (FC converter), 91 . . . battery, 92 . . . battery computer, 93, 95 . . . inverter, 94 . . . vehicle driving motor, 96 . . . high voltage auxiliary machinery, 98 . . . battery DC-DC converter (battery converter), 99 . . . rotational speed sensor, 100 . . . vehicle, 101 . . . front tire, 102 . . . rear tire, 103 . . . front seat, 103L . . . left-side front seat, 103R . . . right-side front seat, 104 . . . rear seat, 105 . . . dashboard, 106 . . . front pillar, 107 . . . center pillar, 108 . . . rear pillar, 109 . . . tunnel part, 110 . . . front cross member, 111 . . . floor panel, 112 . . . front suspension member, 113 . . . deformation promotion part, 114, 115 . . . front frame, 116, 117, 120, 121, 124, 125, 137, 205, 207, 228-233, 242-245 . . . fastener hole, 118, 119 . . . sub-frame, 122, 123 . . . bracket, 126 . . . first cross member, 128, 129 . . . side rocker member, 130 . . . motor mount, 131 . . . mounting rubber, 132 . . . second cross member, 136 . . . third cross member, 138 . . . fourth cross member, 140, 141, 152, 153 . . . binder, 144, 151 . . . sub-cross member, 146, 147 . . . rear rocker member, 150 . . . fifth cross member, 160 . . . rear cross member, 200 . . . fuel cell assembly, 201 . . . fuel cell unit, 202 . . . upper housing, 203 . . . lower housing, 204 . . . upper flange, 206 . . . lower flange, 208 . . . bolt, 209 . . . nut, 210, 211 . . . side face, 212 . . . top face, 213 . . . bottom face, 214 . . . relief shape, 215 . . . ventilation window, 220, 310 . . . protective structure, 221 . . . frame structure, 222 . . . columnar member, 223 . . . reinforcing frame, 224-227 . . . attaching portion, 234, 235 . . . sloping frame, 236 . . . mounting seat, 238 . . . binder, 240 . . . protective panel, 241 . . . panel body, 246 . . . carbon cross fiber, 250 . . . converter assembly, 251, 252 . . . upper housing, 253, 254, 260 . . . connecting terminal, 256 . . . forward inclined face, 257, 259, 282 . . . power cable, 262 . . . bottom face protecting plate, 263, 265 . . . attaching portion, 270 . . . front face protecting plate, 283 . . . power plug, 300 . . . fuel cell assembly, 301b, 301c . . . related device assembly, 302 . . . space, 311 . . . sloping frame, 320 . . . rear-side structure, 321 . . . housing part, 330 . . . front-side structure, 331 . . . related device housing part, A, B . . . surplus length portion, F . . . inclined flange structure, P . . . object, S . . . body

I claimed:

1. A fuel cell assembly, comprising:
a fuel cell unit configured to house a fuel cell; and
a protective structure having a mounting surface configured to mount the fuel cell unit, wherein the mounting surface is disposed in a horizontal direction,
the protective structure including a sloping frame provided obliquely relative to the mounting surface at a position opposing at least one side face of the fuel cell unit,
the fuel cell unit having an inclined flange that is provided on the at least one side face and is inclined relative to the mounting surface of the protective structure, and
the protective structure and the fuel cell unit being mounted so that the side face to which the inclined flange of the fuel cell unit is provided opposes the sloping frame of the protective structure, and so that the sloping frame and the inclined flange intersect when viewed from the side.

2. The fuel cell assembly according to claim 1, wherein at least one face of the fuel cell unit is provided with a relief shape.

3. The fuel cell assembly according to claim 1, wherein the fuel cell assembly is mounted on a vehicle, and the fuel cell assembly is mounted on the vehicle so that the sloping frame of the protective structure faces a side direction of the vehicle.

4. The fuel cell assembly according to claim 3, wherein the protective structure is fastened to a reinforcing frame configuring a part of a frame structure of the vehicle, and
the reinforcing frame and the protective structure are fastened with a bracket which increases a fastening strength.

5. The fuel cell assembly according to claim 3, wherein the protective structure is provided with a related component of the fuel cell on a side that is opposite to a forward travel direction of the vehicle.

6. The fuel cell assembly according to claim 1, wherein the mounting surface of the protective structure is provided with a panel.

7. The fuel cell assembly according to claim 1, wherein the fuel cell unit further houses a power source related device.

* * * * *